(12) United States Patent
Rosenfeld et al.

(10) Patent No.: US 7,027,446 B2
(45) Date of Patent: Apr. 11, 2006

(54) METHOD AND APPARATUS FOR SET INTERSECTION RULE MATCHING

(75) Inventors: Amir Rosenfeld, Omer (IL); Ori Finkelman, Hertzlia (IL); Reuven A Marko, Netanya (IL)

(73) Assignee: P-Cube Ltd., Herzelia (IL)

( * ) Notice: Subject to any disclaimer, the term of this patent is extended or adjusted under 35 U.S.C. 154(b) by 867 days.

(21) Appl. No.: 09/906,653

(22) Filed: Jul. 18, 2001

(65) Prior Publication Data

US 2003/0018693 A1 Jan. 23, 2003

(51) Int. Cl.
- H04L 12/28 (2006.01)
- H04L 12/56 (2006.01)
- G01R 31/38 (2006.01)
- G06F 15/173 (2006.01)
- G06F 15/16 (2006.01)

(52) U.S. Cl. ........... 370/395.31; 370/392; 370/389; 370/235; 709/238; 709/234; 709/235; 718/100; 718/103; 711/108; 711/216; 706/59; 706/20; 712/22; 712/9

(58) Field of Classification Search .......... 709/200, 709/238, 230, 234, 236; 370/392, 389, 395.31, 370/401; 707/102, 6, 8, 1; 711/216; 706/47, 706/59

See application file for complete search history.

(56) References Cited

U.S. PATENT DOCUMENTS

| | | | | |
|---|---|---|---|---|
| 4,180,854 A | * | 12/1979 | Walden et al. | 708/130 |
| 4,837,735 A | * | 6/1989 | Allen et al. | 706/10 |
| 4,984,174 A | * | 1/1991 | Yasunobu et al. | 706/52 |
| 5,010,477 A | * | 4/1991 | Omoda et al. | 712/4 |
| 5,152,000 A | * | 9/1992 | Hillis | 712/11 |
| 5,165,009 A | * | 11/1992 | Watanabe et al. | 706/41 |
| 5,197,130 A | * | 3/1993 | Chen et al. | 712/3 |
| 5,208,768 A | * | 5/1993 | Simoudis | 716/5 |
| 5,245,697 A | * | 9/1993 | Suzuoka | 706/18 |
| 5,249,286 A | * | 9/1993 | Alpert et al. | 711/125 |
| 5,379,393 A | * | 1/1995 | Yang | 711/3 |
| 5,414,704 A | | 5/1995 | Spinney | 370/60 |

(Continued)

FOREIGN PATENT DOCUMENTS

EP 459233 A2 * 12/1991

(Continued)

OTHER PUBLICATIONS

Pooch; Translation of Decision Tables; ACM Computing Surveys (CSUR); vol. 6, Is. 2; Jun. 1974.*

(Continued)

*Primary Examiner*—Anthony Knight
*Assistant Examiner*—Meltin Bell
(74) *Attorney, Agent, or Firm*—Abelman, Frayne and Schwab

(57) ABSTRACT

A method and apparatus for of high-speed and memory efficient rule matching, the rule matching being performed on an m-dimensional universe with each dimension bound by a given range of coordinate values, and a set of rules that apply to an undetermined number of coordinates in that universe. More specifically, a high-speed computer based packet classification system, uses an innovative set intersection memory configuration to provide efficient matching of packets flowing through a network system to a specific process flow based on a packet tuple. The system also provides classification of packets as they flow through a network system. More particularly, this system correlates these flowing packets with previously received packets, along with identifying the packets so that they are handled efficiently. The ability to correlate packets to their corresponding process flows permits the implementation of service aware networks (SAN) that are capable of handling network situations at the application level.

91 Claims, 10 Drawing Sheets

RULE VECTOR LOADING HAVING A RANGE OF VALUES

U.S. PATENT DOCUMENTS

| | | | | |
|---|---|---|---|---|
| 5,438,670 A * | 8/1995 | Baror et al. | | 711/3 |
| 5,463,777 A | 10/1995 | Bialkowski et al. | | 395/600 |
| 5,465,343 A * | 11/1995 | Henson et al. | | 711/112 |
| 5,473,680 A * | 12/1995 | Porter | | 379/221.15 |
| 5,574,910 A | 11/1996 | Bialkowski et al. | | 395/601 |
| 5,592,590 A * | 1/1997 | Jolly | | 706/59 |
| 5,649,181 A * | 7/1997 | French et al. | | 707/3 |
| 5,689,670 A * | 11/1997 | Luk | | 712/207 |
| 5,720,005 A * | 2/1998 | Goke et al. | | 706/1 |
| 5,727,229 A * | 3/1998 | Kan et al. | | 712/22 |
| 5,742,761 A * | 4/1998 | Olnowich et al. | | 709/250 |
| 5,745,488 A | 4/1998 | Thompson et al. | | 370/395 |
| 5,757,795 A * | 5/1998 | Schnell | | 370/392 |
| 5,764,736 A * | 6/1998 | Shachar et al. | | 379/93.09 |
| 5,799,291 A * | 8/1998 | Eichfeld et al. | | 706/1 |
| 5,805,874 A * | 9/1998 | Gallup et al. | | 712/222 |
| 5,815,500 A | 9/1998 | Murono | | 370/401 |
| 5,854,938 A * | 12/1998 | Ogi | | 712/30 |
| 5,890,202 A * | 3/1999 | Tanaka | | 711/111 |
| 5,951,651 A * | 9/1999 | Lakshman et al. | | 709/239 |
| 6,014,508 A * | 1/2000 | Christian et al. | | 716/13 |
| 6,018,794 A * | 1/2000 | Kilpatrick | | 711/167 |
| 6,032,190 A | 2/2000 | Bremer et al. | | 709/238 |
| 6,052,683 A | 4/2000 | Irwin | | 707/8 |
| 6,081,884 A * | 6/2000 | Miller | | 712/204 |
| 6,084,877 A * | 7/2000 | Egbert et al. | | 370/389 |
| 6,111,874 A | 8/2000 | Kerstein | | 370/389 |
| 6,125,359 A * | 9/2000 | Lautzenheiser et al. | | 706/60 |
| 6,161,144 A | 12/2000 | Michels et al. | | 709/238 |
| 6,175,867 B1 * | 1/2001 | Taghadoss | | 709/223 |
| 6,189,034 B1 * | 2/2001 | Riddle | | 709/227 |
| 6,208,640 B1 * | 3/2001 | Spell et al. | | 370/358 |
| 6,233,686 B1 * | 5/2001 | Zenchelsky et al. | | 713/201 |
| 6,249,614 B1 * | 6/2001 | Kolesnik et al. | | 382/251 |
| 6,314,471 B1 * | 11/2001 | Alverson et al. | | 710/5 |
| 6,317,819 B1 * | 11/2001 | Morton | | 712/22 |
| 6,321,217 B1 * | 11/2001 | Maeda et al. | | 706/47 |
| 6,353,817 B1 * | 3/2002 | Jacobs et al. | | 706/50 |
| 6,393,413 B1 * | 5/2002 | Jorgensen et al. | | 706/20 |
| 6,434,156 B1 * | 8/2002 | Yeh | | 370/401 |
| 6,438,532 B1 * | 8/2002 | Kiji | | 706/45 |
| 6,480,489 B1 * | 11/2002 | Muller et al. | | 370/389 |
| 6,481,005 B1 * | 11/2002 | Crowley et al. | | 717/100 |
| 6,502,134 B1 * | 12/2002 | Makarios et al. | | 709/225 |
| 6,522,632 B1 * | 2/2003 | Waters et al. | | 370/254 |
| 6,560,592 B1 * | 5/2003 | Reid et al. | | 707/2 |
| 6,584,110 B1 * | 6/2003 | Mizuta et al. | | 370/401 |
| 6,587,963 B1 * | 7/2003 | Floyd et al. | | 714/25 |
| 6,600,724 B1 * | 7/2003 | Cheng | | 370/236 |
| 6,615,210 B1 * | 9/2003 | Huang et al. | | 707/6 |
| 6,631,419 B1 * | 10/2003 | Greene | | 709/238 |
| 6,643,628 B1 * | 11/2003 | Jackson et al. | | 706/25 |
| 6,697,362 B1 * | 2/2004 | Akella et al. | | 370/389 |
| 6,700,889 B1 * | 3/2004 | Nun | | 370/392 |
| 6,704,717 B1 * | 3/2004 | Tate | | 706/15 |
| 6,714,736 B1 * | 3/2004 | Fawaz et al. | | 370/236 |
| 6,725,452 B1 * | 4/2004 | Te'eni et al. | | 717/168 |
| 6,728,243 B1 * | 4/2004 | Jason et al. | | 370/392 |
| 6,768,739 B1 * | 7/2004 | Kobayashi et al. | | 370/392 |
| 6,775,290 B1 * | 8/2004 | Merchant et al. | | 370/395.53 |
| 6,778,984 B1 * | 8/2004 | Lu et al. | | 707/4 |
| 6,788,697 B1 * | 9/2004 | Aweya et al. | | 370/412 |
| 6,813,645 B1 * | 11/2004 | Meyer | | 709/245 |
| 6,826,561 B1 * | 11/2004 | Cao et al. | | 707/3 |
| 6,831,893 B1 * | 12/2004 | Ben Nun et al. | | 370/235 |
| 6,839,349 B1 * | 1/2005 | Ambe et al. | | 370/390 |
| 6,862,106 B1 * | 3/2005 | Matsushima | | 358/1.17 |
| 6,873,735 B1 * | 3/2005 | Aleksic et al. | | 382/233 |
| 6,928,482 B1 * | 8/2005 | Ben Nun et al. | | 709/235 |
| 6,934,696 B1 * | 8/2005 | Williams et al. | | 706/47 |
| 2001/0039576 A1 * | 11/2001 | Kanada | | 709/223 |
| 2002/0085573 A1 * | 7/2002 | McDonnell | | 370/412 |

FOREIGN PATENT DOCUMENTS

| | | | |
|---|---|---|---|
| GB | 2399199 A * | 9/2004 | |
| WO | WO 9913620 A2 * | 3/1999 | |

OTHER PUBLICATIONS

Fraser et al; Engineering a simple, efficient code-generator generator; ACM Letters on Programming Languages and Systems (LOPLAS); vol. 1, Is. 3; Sep. 1992.*

O'Neil et al; Improved query performance with variant indexes; Proceedings of the 1997 ACM SIGMOD international conference on Management of data; vol. 26, Is. 2; Jun. 1997.*

Bottoni et al; An APL rule-based system architecture for image interpretation strategies; Proceedings of the international conference on APL; vol. 21, Is. 4; Jul. 1991.*

Hernandez-Valencia et al; The building blocks of a data-aware transport network; deploying viable Ethernet and virtual wire services via multiservice ADMs; IEEE Communications Magazine; vol. 42, Is. 3; Mar. 2004; pp 104-111.*

Serre et al; Implementing OSI-based interfaces for network management; IEEE Communications Magazine; vol. 31, Is. 5; May 1993; pp 76-81.*

IEEE 100: The Authoritative Dictionary of IEEE Standards Terms; Seventh Edition; Dec. 2000; pp iii, v-x, 6, 682.*

Held; High-Speed Networking with LAN Switches; ISBN 0-471-18444-6; 1997; pp iii-ix, xi-xii, 7-8, 37-61, 63-105, 109, 122-127, 133-134, 138-141, 176, 187-189, 204, 211, 214-216, 223-224, 230-238, 244, 246-247, 262, 264-272.*

Lew; Optimal conversion of extended-entry decision tables with general cost criteria; Communications of the ACM; vol. 21, Is. 4; Apr. 1978; pp 269-279.*

Nedjah; Technical Correspondence: Minimal deterministic left-to-right pattern-matching automata; ACM SIGPLAN Notices; vol. 33, Is. 1; Jan. 1998; pp 40-47.*

Doerschler et al; A rule-based system for dense-map name placement; Communications of the ACM; vol. 35, Is. 1; Jan. 1992; pp 68-79.*

Marcus; A design for a parser for English; Proceedings of the annual conference; Oct. 1976; pp 62-68.*

Cohen et al; Analyses of deterministic parsing algorithms; Communications of the ACM; vol. 21, Is. 6; Jun. 1978; pp 448-458.*

Nauck et al; NEFCLASS for Java—new learning algorithms; 18th International Conference of the North American Fuzzy Information Processing Society; Jul. 1999; pp 472-476.*

Mercer et al; An array grammar programming system; Communications of the ACM; vol. 16, Is. 5; May 1973; pp 299-305.*

Shieh et al; A GA-based Sugeno-type fuzzy logic controller for the cart-pole system; 23rd International Conference on Industrial Electronics, Control and Instrumentation; vol. 3; Nov. 9-14, 1997; pp 1028-1033.*

Cabri et al; Reactive Tuple Spaces for Mobile Agent Coordination; Lecture Notes In Computer Science; vol. 1477; Proceedings of the Second International Workshop on Mobile Agents; 1998; pp 237-248 □□.*

Gildea et al; Learning bias and phonological-rule induction; Computational Linguistics; vol. 22, Is. 4; Dec. 1996; pp 497-530.*

Fromkin et al; An interactive phonological rule testing system; Proceedings of the 1969 conference on Computational linguistics; Sep. 1969; pp 1-21.*

Tannenbaum; Computer Networks; Fourth Edition; Aug. 9, 2002; 3 copyright pages, 2 Other bestselling titles pages, 4 Preface pages, 2 About pages.*

Lakshman et al; High-Speed Policy-based Packet Forwarding Using Efficient Multi-dimensional Range Matching; ACM SIGCOMM; Feb. 1998; pp 203-214.*

Zanin et al; ADAPT—a low-cost videoconference model for personal computers running on IP networks; Proceedings of the ACM symposium on Applied computing; Mar. 2001; pp 446-447.* van der Merwe et al; Papers: mmdump: a tool for monitoring internet multimedia traffic; ACM SIGCOMM Computer Communication Review; vol. 30, Is. 5; Oct. 2000; pp 48-59.*

Jiang et al; Towards junking the PBX: deploying IP telephony: Proceedings of the 11th international workshop on Network and operating systems support for digital audio and video; Jan. 2001; pp 177-185.*

Conway; A performance monitoring system for VoIP gateways; Proceedings of the 2nd international workshop on Software and performance; Sep. 2000; pp 38-43.*

Quinn et al; Fast Ethernet; ISBN 0-471-16998-6; 1997; pp iii-vii, ix, xi-xiv, 18, 31-33, 74, 110-113, 247-248, 251, 279-282, 321-328, 383, 411-417.*

* cited by examiner

RULE TABLE (RT) LOADED WITH RULE VECTOR $RV_0$

| | 0 | | | | 1 | | | | 2 | | | | 3 | | | | 4 | | | | 5 | | | |
|---|---|---|---|---|---|---|---|---|---|---|---|---|---|---|---|---|---|---|---|---|---|---|---|---|
| | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 |
| 0 | 1 | | | | | | | | | | | | | | | | | | | | | | | |
| 1 | | | | | | | | | | | | | | 1 | | | | | | | | | | |
| 2 | | | | | | | | | | | | | | | | | | | | | | 1 | | |
| 3 | | | | | | | | | | | | | | | | | | | | | | 1 | | |
| 4 | | | | | | | | | | | | | | | | | 1 | | | | | | | |
| 5 | | | | | | | | | | | | | | | | | 1 | | | | | | | |
| 6 | | | | | | | | | 1 | | | | | | | | | | | | | | | |
| 7 | | | 1 | | | | | | | | | | | | | | | | | | | | | |
| 8 | | | 1 | | | | | | | | | | | | | | | | | | | | | |

FIG. 3

RULE TABLE (RT) LOADED WITH RULE VECTORS $RV_0$ AND $RV_1$

| | 0 | | | | 1 | | | | 2 | | | | 3 | | | | 4 | | | | 5 | | | |
|---|---|---|---|---|---|---|---|---|---|---|---|---|---|---|---|---|---|---|---|---|---|---|---|---|
| | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 |
| 0 | 1 | | | | 1 | | | | | | | | | | | | | | | | | | | |
| 1 | | | | | 1 | | | | | | | | 1 | | | | | | | | | | | |
| 2 | | | | | 1 | | | | | | | | | | | | | | | | 1 | | | |
| 3 | | | | | | | | | | | | | | | | | | | | | 1 | 1 | | |
| 4 | | | | | | | | | | | | | | | | | 1 | 1 | | | | | | |
| 5 | | | | | | | | | | | | | 1 | 1 | | | | | | | | | | |
| 6 | | | | | | 1 | | | 1 | | | | | | | | | | | | | | | |
| 7 | | | 1 | 1 | | | | | | | | | | | | | | | | | | | | |
| 8 | | | | | 1 | | | | | | | | | | | | | | | | | 1 | | |

FIG. 4

RULE TABLE (RT) LOADED WITH RULE VECTORS $RV_0$ $RV_1$ AND $RV_2$

| | 0 | | | | 1 | | | | 2 | | | | 3 | | | | 4 | | | | 5 | | | |
|---|---|---|---|---|---|---|---|---|---|---|---|---|---|---|---|---|---|---|---|---|---|---|---|---|
| | 0 | 1 | 2 | 3 | 0 | 1 | 2 | 3 | 0 | 1 | 2 | 3 | 0 | 1 | 2 | 3 | 0 | 1 | 2 | 3 | 0 | 1 | 2 | 3 |
| 0 | 1 | 1 | | | 1 | | | | | | | | | | | | | | | | | | | |
| 1 | | | | | 1 | | | | | 1 | | | 1 | | | | | | | | | | | |
| 2 | | | | | 1 | | | | | | | | | | | | | | | | 1 | 1 | | |
| 3 | | | | | | | | | | | | | | | | | | | | | 1 | 1 | 1 | |
| 4 | | | | | | | | | | | | | | | | | 1 | 1 | | | | | 1 | |
| 5 | | | | | | 1 | | | | | | | 1 | 1 | | | | | | | | | | |
| 6 | | | | | | 1 | | | 1 | 1 | | | | | | | | | | | | | | |
| 7 | | | 1 | 1 | | | | | | | | | | | | | | 1 | | | | | | |
| 8 | | | | | 1 | | | | | | | | 1 | | | | | | | | | 1 | | |

FIG. 5

LOADED RULE TABLE CHECKED AGAINST DATA VECTOR (DV)

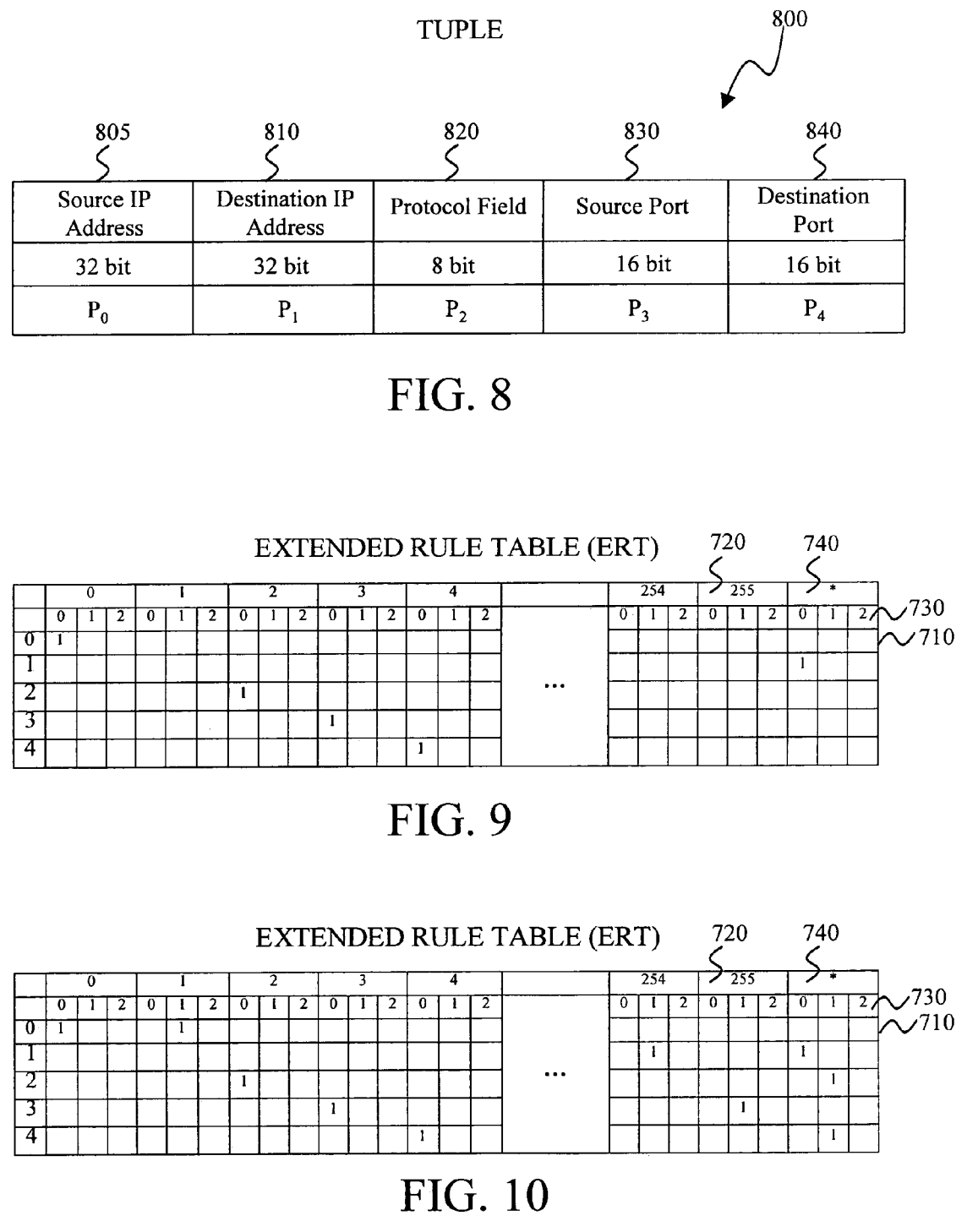

TUPLE 800

| 805 | 810 | 820 | 830 | 840 |
|---|---|---|---|---|
| Source IP Address | Destination IP Address | Protocol Field | Source Port | Destination Port |
| 32 bit | 32 bit | 8 bit | 16 bit | 16 bit |
| $P_0$ | $P_1$ | $P_2$ | $P_3$ | $P_4$ |

FIG. 8

EXTENDED RULE TABLE (ERT)

FIG. 9

EXTENDED RULE TABLE (ERT)

FIG. 10

RULE TABLE FOR RED GREEN BLUE (RGB) SIGNAL (RED LOADED)

FIG. 13

RULE TABLE FOR RED GREEN BLUE (RGB) SIGNAL (RGB LOADED)

FIG. 14

MODIFIED EXTENDED RULE TABLE (MERT)

FIG. 15

METHOD AND APPARATUS FOR SET INTERSECTION RULE MATCHING

BACKGROUND OF THE INVENTION

1. Field of the Invention

The present invention relates generally to rule matching in an m-dimensional universe with each dimension bound by a lower and upper limit value. In one example, this invention relates to the classification of packets, based on the tuple information, in high-speed digital communication networks, where the implementation of the system does not require dedicated hardware other than the computer system.

2. Description of the Related Art

There are many ways of implementing search engines that perform searches based on various types of search criteria. Consider, for example, a dating search engine utilizing several parameters for the actual search such as gender, age, height, weight, and income level. This type of matching system may develop various ways of matching persons and prioritizing the actual findings based on a variety of rules. In some instances, it may be beneficial to identify which rule applies to a particular coordinate in the various parameters.

One of the traditional approaches for this type of search includes a step by step check of each and every rule to determine if they match any or all of the coordinates possible in the system. Although these types of systems are possible, they are inefficient because they require a significant amount of computational power (e.g., CPU time, memory requirements, etc.) to complete within a reasonable amount of time. As the number of parameters and rules increase, so does the complexity of the search, resulting in a need for even more computational power.

Packets of data flow through a network of computers carrying portions of digital information between the different nodes. Broadly, the results of an application running at one node may be sent to a computer at another network node. To establish the transfer of data, the information is packetized and sent over their respective networks. A complete packet communication may be defined as the sending of a packet upstream, from a source computer system, where it proceeds along a communication path, and then downstream to a destination computer. Efficient network management and system administration of computer systems utilizing upstream/downstream packet communications typically require some type of packet content analysis to maintain this efficiency.

A typical packet utilized for computer network communications includes a packet header. A packet header, which is also referred to as a tuple, typically contains several sections comprising a total of 104 bits. A typical 104 bit packet header contains 32 bits for the Internet protocol ("IP") source, 32 bits for the IP destination, 16 bits for the port source, 16 bits for the port destination, and the last 8 bits to identify the protocol type. Using the above-described configuration, the tuple typically contains information that can be used to identify the source and destination of the packet. In a high-speed network, millions of packets are sent every second. Thus, it is typically necessary to process these packets at wire speed in order to analyze them effectively and efficiently. It is also desirable for the processed packets to arrive at the appropriate destinations "unharmed." Furthermore, it is desirable to provide these services to low-cost, general computing systems which are typically limited in their ability to efficiently communicate, receive and process packet header information.

A common problem that occurs during processing of an address space, such as the 104 bit tuple, is the inability to effectively process such a large memory address. To accomplish this, traditional systems commonly utilize a variety of hash tables or other techniques. However, these traditional systems typically lack the capability of operating at wire speed while addressing over one million different process flows.

Some of the traditional systems require numerous steps which grow in number, either linearly or exponentially, based on the number of process flows identified. Other systems require complex resources in order to effectively process the data. Commonly, these systems require a search mechanism that is time consuming and is therefore impractical for wire speed applications.

For example, U.S. Pat. No. 5,414,704 (Spinney) describes a method of searching with an N-bit input address hashed into N-bits. Spinney also describes the use of the lower 16-bits of the hashed address to supply pointers to a maximum of seven buckets. However, Spinney's described solution is not suited for network applications, and also does not support processing at wire-speed. The deficiencies of the Spinney system results from that system's utilization of a binary look-up tree, in conjunction with a content addressable memory (CAM) that is used in parallel to a hash function. The Spinney patent is incorporated herein by reference in its entirety for all purposes.

Descriptions of other types of searching methods may be found in U.S. Pat. No. 5,463,777 (Bialokowski et al.) and U.S. Pat. No. 5,574,910 (Bialokowski et al.). These references describe the use of a binary search tree that relies on a software implementation of an associative memory to match packet headers. While both of the Bialokowski et al. patents describe methods of searching nodes, they require extensive computational resources. Both of the Bialokowski et al. patents are incorporated herein by reference in their entirety for all purposes.

In U.S. Pat. No. 5,745,488 (Thompson et al.) another approach to packet processing is described. Thompson et al. describes a system where a packet tuple is checked and compared against a table of packet types. In this system, the table is implemented using a CAM. The packet tuple is classified so that further processing may occur, while another packet, having a different type, is processed on other system resources. The Thompson et al. patent is incorporated herein by reference in its entirety for all purposes.

Another method is discussed in U.S. Pat. No. 5,815,500 (Murono). Murono describes a system having a plurality of CAMs for the detection of certain packet header information, wherein each CAM is preloaded with the appropriate information. This approach is used in an attempt to expedite packet header processing and therefore increase the speed that the packet is processed through the system. However, the Murono approach is limited based upon this system's reliance upon the utilization of CAMs. The Murono patent is incorporated herein by reference in its entirety for all purposes.

Additional methods and techniques for increasing the speed of look-up tables are described in U.S. Pat. No. 6,032,190 (Bremer et al.), U.S. Pat. No. 6,052,683 (Irwin) U.S. Pat. No. 6,111,874 (Kerstein), and in U.S. Pat. No. 6,161,144 (Michels et al.). Some of the disadvantages of these systems and methods relate to their inability to ensue a predictable and limited time period for packet classification. In those systems, packet classification time typically varies from packet to packet, and in most cases is unpredictable, the utilization of these types of methods do not work well in a time sensitive system (e.g., a computer network). Moreover, these traditional systems' extensive use of CAMs further complicates the overall design, resulting in excessive implementation costs. The Bremer et al., Irwin, Kerstein, and Michels et al. patents are incorporated herein by reference in their entirety for all purposes.

SUMMARY OF THE INVENTION

In view of the foregoing, one aspect of the present invention provides a method for rule checking a two dimensional rule table to identify whether one or more rules of a given rule-set apply to a specified data value.

In accordance with one aspect of the present invention, at least one rule vector is loaded into the available space of the rule table. Once the rule table has been loaded, the content of the rule table is compared to the data vector to determine whether one or more rules apply to the data vector.

In accordance with another aspect of the present invention, the number of rows in the rule table is determined from the maximum number of parameters of a rule vector. Also, the number of segments in each row is determined according to the maximum value possible for the parameters, and the number of bits in each segment is determined according to the maximum number of rules to be used in the rule table.

In another aspect of the present invention, the rule table may be constructed as a two dimensional memory array where the size of the array is defined by a user.

In still yet another aspect of the present invention, a computer's cache size is used to determine the size parameter of a rule table value segment.

In another aspect of the present invention, one of the rule table value segments utilize a "don't care" value.

In another aspect of the present invention, rule checking identifies a packet tuple based on its correspondence to any of the rules in the rule table.

In accordance with another aspect of the present invention, rule checking provides packet tuple processing in a predetermined time frame.

In another aspect of the present invention, rule checking provides packet tuple processing to be performed even though at least some of the parameter data is missing.

In accordance with another aspect of the present invention, rule checking is implemented as a resource conserving application so the system memory can be optimized.

These and other aspects, features and advantages of the present invention will become more apparent upon consideration of the following description of the preferred embodiments of the present invention taken in conjunction with the accompanying drawings.

BRIEF DESCRIPTION OF THE DRAWINGS

FIG. 3 is a diagram illustrating a partially populated rule table after being loaded with a value vector for a first rule;

FIG. 4 is a diagram illustrating a rule table after being loaded with a value vector for a second rule;

FIG. 5 is a diagram illustrating a rule table after being loaded with a value vector for a third rule;

FIG. 8 is a diagram illustrating bit locations of a typical packet tuple;

FIG. 9 is a diagram illustrating an enhanced rule table after being loaded with a value vector for a first rule;

FIG. 10 is a diagram illustrating an enhanced rule table after being loaded with a value vector for a second rule;

FIG. 13 is a diagram illustrating a rule table after being loaded with a range of values of a first parameter;

FIG. 14 is a diagram illustrating a rule table after being loaded with a range of values of all of the range parameters;

FIG. 15 is a diagram illustrating an exemplary modified extended rule table (MERT) for a network tuple.

DETAILED DESCRIPTION OF THE PREFERRED EMBODIMENTS

In the following description of several embodiments, reference is made to the accompanying drawings, which form a part hereof It is to be understood by those of working skill in this technological field that other embodiments may be utilized, and structural and procedural changes may be made without departing from the scope of the present invention.

One embodiment of the present invention utilizes a computer system to identify the applicability of one or more rules of a given rule-set to a specific case. An appropriate computer system would include standard computer components, such as a central processing unit (CPU), memory, and the necessary interfaces to permit system input/output. A portion of the computer system's memory may be allocated for the creation of a rule table. A rule table may be constructed as a two dimensional memory array where the size of the array may be modified to accommodate any computer memory restrictions or limitations. The memory array size also may be defined or modified by a user.

Figure 1:
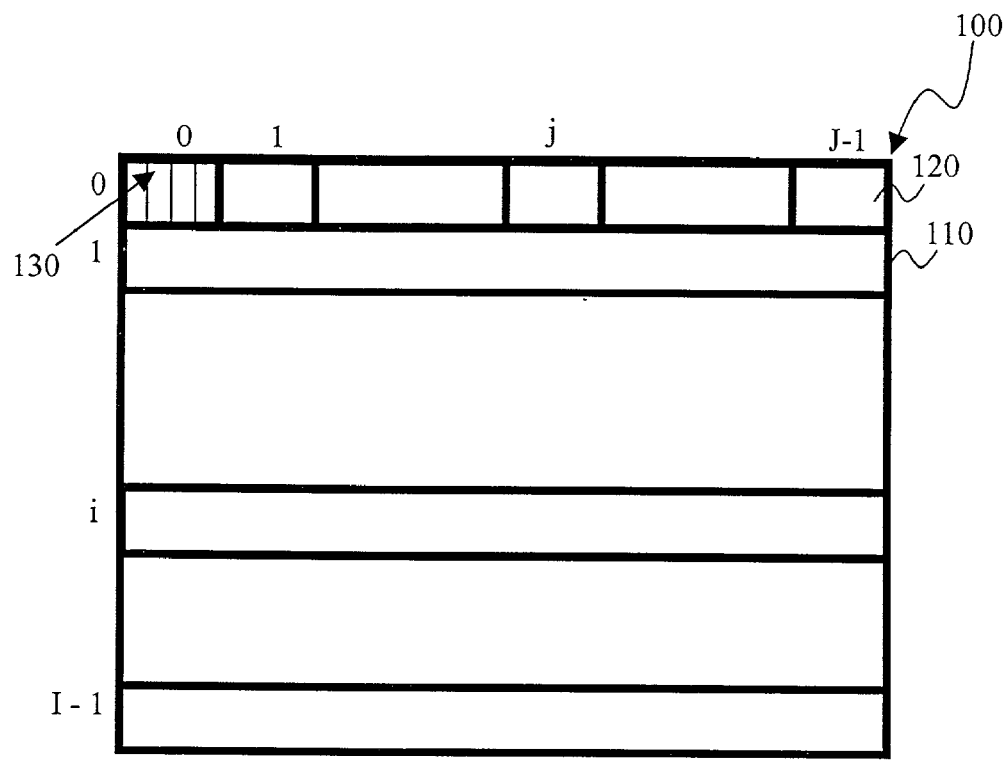
FIG. 1 is a diagram illustrating an exemplary rule table having (I) parameters, (J) values and (R) rules.

FIG. 1 shows a two dimensional rule table (RT) 100, comprising a predefined number of rows 110. Each row 110 is divided into value segments 120, each representing one possible value for a component of a rule vector (RV). Each value segment 120 is divided into a field of bits. The bits 130 located at the same location in each of the value segments 120 are used to define a particular rule. In a system having a maximum of "T" rows, "J" value segments, and "R" rules will result in a memory requirements of I*J*R bits for the rule table, or I*J*R/8 bytes, as each byte contains 8 bits. The array "A(I, J, R)" will be the format used to illustrate how a particular bit in the RT 100 may be addressed.

The present invention may be configured to accommodate a rule table having a number of value segments based on certain system parameters. One method to determine the number of value segments is to correlate the number of value segments with the cache size of the current system. That is, the number of different types of rules (i.e., length of a value segment 120) can be determined based on the length of one line of a cache in a computer system. Utilizing a computer system's cache size as the value segment 120 size parameter enhances the overall performance of present invention since unnecessary access to system memory is prevented.

The rule table 100 may be loaded with one or more sets of rule vectors (RVs). A format of an exemplary rule vector that may be used in the present invention is as follows:

rule-vector=<$P_0$>.<$P_1$>.<$P_2$> ... <$P_n$>

A rule vector utilized in the present invention may have one or more rule parameters (e.g., $P_0$, $P_1$, $P_2$, etc.), which are used to describe the specific rule. Typically, the number of possible rule parameters are defined prior to rule table loading, during initialization.

Load Rules into a Rule Table (RT)

Figure 2:
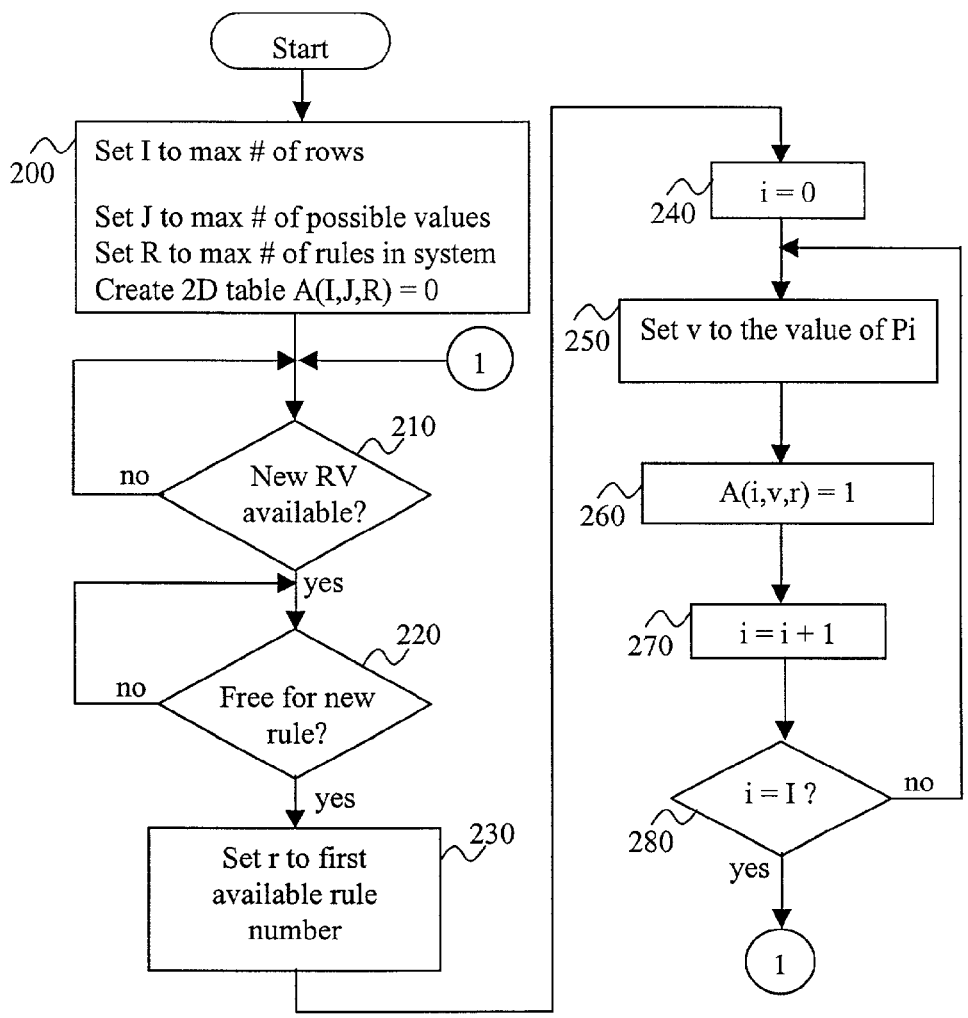
FIG. 2 is a flowchart illustrating a exemplary method of loading a rule table.

FIG. 2 shows an exemplary method of loading a rule table with rule vectors, and this method will be discussed with reference to the rule table (RT) 100 shown in FIG. 1. In FIG. 2, at operation 200, rules are loaded into the RT 100 by first initializing several parameters. Specifically, the number of rows "I" in the RT 100 are set to the maximum number of value vectors. The number of value segments 120 in each row are set to the maximum number of possible values (J) that are possible (J=max. values). The size of each value segment 120 (i.e., number of bits) is set to the maximum number of rules (R) that are utilized in the current system. The setting of all the bits in the RT 100 to a logical value "0" is also performed in this operation (A(I, J, R)=0).

In operation 210, the system waits for the availability of a new rule vector. If no rule vector is available, then control stays at this operation. However, once a rule vector is made available, control will flow to operation 220 where the system checks the RT 100's space availability (i.e., does the rule table have room for an additional row). If no space is available, then control remains at this operation while the system continues to check for space availability. However, once space availability is detected, control flows to operation 230. In another embodiment of the invention, a notification of the inability of space in RT 100 is generated. In yet another embodiment of the invention, an error exception is generated and a process to increase the size of the RT 100 takes place by adding rule bits 130 to each value segment 120 of the RT 100.

In operation 230, the system sets the variable "r" to point to the first available rule number in the RT 100. If the RT 100 does not contain any rules (i.e., an empty rule table), "r" would point to "0". The value of "r" will therefore increase by one when a new rule is loaded into RT 100, and will be decrease by one or more to reflect the emptying of one or more rules from the system.

Next, in operation 240 the value vector counter "i" is reset to "0". This counter is used as a counting variable so that an inner loop may be established. The inner loop includes operations 250–280, which enables the system to proceed through each row of the RT 100. Once the value vector counter "i" counter is reset, control flows to operation 250 where the variable "v" is set to the value of the $i^{th}$ parameter of the RV. At this point, variables "i", "v" and "r" have all been set to their appropriate values.

Next, in operation 260, the system sets an identified bit in the RT 100, such that A(i,v,r)=1. In other words, the specified bit in a rule table "A" which corresponds to the $i^{th}$ row, at the $j^{th}$ value segment, and the respective $r^{th}$ rule (i.e. the $r^{th}$ bit 130 in the $j^{th}$ value segment 120), is set to logical "1."

In operation 270, the vector value counter "i" is increased by one and then checked to determine if "i" has reached the maximum value "I" (operation 280). Once again, "I" represents the maximum number of value vectors. Thus, when "i" reaches "I", all of the parameters of the RV will have been processed. As long as "i" is smaller than "I", the sequence of operations 250 through 280 continue. However, once the value of "I" is reached, the system will exit out of the inner loop and continue execution at operation 210, waiting for a new RV to become available.

Rule Table Loading with a First Rule Vector Rule

FIGS. 3–5 show a specific, non-limiting, example of a rule table (RT) after being loaded with value vectors using the method illustrated in FIG. 2. More particularly, these figures show examples of a loaded rule table RT 100 having a plurality of value segments 120, rows 110, and rule bits 130. In these figures a total of six value segments 120 are shown, and are labeled as segment 0 through 5. The RT 100 also has nine rows 110, labeled 0 through 8. Each individual value segment 120 is divided into four rule bits 130, which are labeled 0 through 3. Thus, each value segment 120 in the illustrated RT 100 has four rule cells (0–3). Each of these rule cells has a bit-wise property such that each bit (i.e., each rule cell) is capable of having a logical value of "0" or "1". For clarity, the RT 100 rule cells having a logical value of "0" will be denoted by a blank cell. It should also be noted that the substance of a particular rule is not essential to the understanding of the present invention.

To illustrate one aspect of the present invention that provides a rule table loading method, the following exemplary RVs will be used. Specifically, the loading of rule vector values into a RT 100 will be demonstrated using the following exemplary rules, $RV_0$, $RV_1$, and $RV_2$:

$RV_0$=0.3.5.5.4.3.2.1.1

$RV_1$=1.1.1.5.4.3.1.1.5

$RV_2$=0.2.5.4.5.1.2.4.3

First of all, it is to be understood that a rule vector (RV) structure has several components. Using $RV_0$ as an example, a rule vector contains nine parameter values (0.3.5.5.4.3.2.1.1), wherein each of these parameters relate to one of the rows 110 in the RT 100. For example, in the $RV_0$, the value of the first parameter "0" corresponds to the first row "0", the value of the second parameter "3" corresponds to the second row "1", while the value of the ninth parameter "1" of the $RV_0$ corresponds to the ninth (last) row "8" in the rule table. The actual value of each of these nine parameters ("0", "3", etc.) identifies the value segment 120. Since six value segments 120 exist in the RT 100, each parameter may contain a value between 0 and 5. For example, the first parameter value "0" in the $RV_0$ indicates that the value segment "0" is to be used to set the rule bit, while the second parameter value "3" indicates that the value segment "3" is to be used.

Lastly, the subscript of the rule vector, which is "0" in the $RV_0$ example, relates to a location of the rule cell (or rule bit) 130 within a particular value segment 120. Again, each segment 120 parameter is divided into separate rule cells, labeled 0–3. Thus, bit setting for $RV_0$ will take place in the rule cell labeled "0", while $RV_1$ and $RV_2$ will use rule cells "1" and "2", respectively. With this understanding, rule table loading of the rule vectors $RV_0$, $RV_1$, and $RV_2$ will now be described. In a first example, the method illustrated in FIG. 2 is used to load the rule values denoted by $RV_0$ into a rule table, which results in the rule table shown in FIG. 3.

Referring now to FIG. 2, at operation 200, rule vector loading is initiated by first initializing several parameters "I", "J", "R", along with setting all the bits in RT 100 to a logical "0" (A(I, J, R)=0)). In the present example, "I" is set to 9, "J" is set to 6, and "R" is set to 4.

Next, in operation 210, the rule vector ($RV_0$) is made available to the system. Since the RT 100 still has space available for a new rule (operation 220), control flows to operation 230 where the rule incrementing variable "r" is set to "0" (i.e., "r" is set to the first available rule number).

Next, in operation 240, the value vector counter "i" (corresponding to the row of the RT 100) is reset to "0." Control then flows to operation 250, which is the first operation in the inner loop controlled by the vector counter "i." In operation 250, the variable "v" (corresponding to the value segment 120) is set to the $i^{th}$ parameter (i.e., $v=P_0=0$) of the $RV_0$. At this point, "i" is set to "0", "v" is set to "0", and "r" is set to "0."

In operation 260, the identified bit location in the RT 100, denoted by A(i,v,r), is set to a logical "1." In the current example, A(0,0,0) is set to a logical "1." Put another way, the first parameter of $RV_0$, which is $P_0=0$, results in setting a bit to "1" in the first row 110 (row "0"), in the first segment 120 (segment "0") of the RT 100. Also, the first bit (i.e., bit 0) of the four bit rule field is used since this is the first rule (i.e., the subscript of the $RV_0$ is "0").

In operation 270, the vector value counter "i" is incremented by one and then checked to determine if any additional vectors remain in the $RV_0$ (operation 280). In the current example, eight additional parameters $P_i$ remain in $RV_0$, so control passes back to operation 250 so that the next parameter $P_1$ ("3") may be loaded into the RT 100.

Returning to operation 250, the second parameter of $RV_0$, which is $P_1=3$, is processed by executing the operations 250 through 280. The completion of these operations results in the setting of a bit to a logical "1" in the second row 110 (row 1), in the fourth segment 120 (segment "3") of the RT 100. The fourth segment 120 is used since the value of $P_1$ is "3," and the second row 110 is used since this is the second parameter in the $RV_0$. Once again, the first bit (i.e., the "0" bit location) within the fourth segment 120 is used since this is the first rule (i.e., the subscript of the $RV_0$ is "0").

This process of setting the appropriate rule bits 130 in the RT 100 is continued by cycling through operations 250 through 280 for each of the parameters in the $RV_0$. Once completed, the RT 100 will be loaded with the $RV_0$ parameters. FIG. 3 shows an example of a rule table loaded with the $RV_0$ rule vector.

Control is then transferred back to operation 210, where the system determines whether a new RV is available. In the current example, the next rule vector ($RV_1$) is available, and since space is available in the RT 100 (operation 220), the rule incrementing variable "r" is then set to "1". Similarly to the method used to load $RV_0$, the RT 100 is loaded with the value vectors contained in $RV_1$ (i.e., "1.1.1.5.4.3.1.1.5") by cycling through operations 250 through 280. Upon exiting conditional operation 280, the RT 100 will be loaded with rule parameters $RV_0$ and $RV_1$. FIG. 4 shows an example of a rule table loaded with the $RV_0$ and $RV_1$ rule vectors.

Once again, control is transferred back to operation 210 where the system again determines whether a new RV is available. In the present example, the next rule vector ($RV_2$) is made available to the system. Since the RT 100 still has space available for a new rule (operation 220), control flows to operation 230 where the rule incrementing variable "r" is set to "2" (i.e., "r" is set to the first available rule number). Similarly to the methods used to load the $RV_0$ and $RV_1$ vector values, the RT 100 is loaded with the $RV_2$ value vectors (i.e., 0.2.5.4.5.1.2.4.3). This is performed by cycling through operations 240 through 280. FIG. 5 shows an example of a rule table loaded with the $RV_0$, $RV_1$, and $RV_2$ rule vectors.

Control is then transferred to conditional operation 210 where the system waits for a new RV. However, in our current example, no new RV is available. Thus, the system waits at this operation until a new RV becomes available. Although a rule table having only three rules has been described, it should be understood that the RT 100 may be modified to include dozens or even hundreds of rules by utilizing the just-described methods Loaded Rule Table Checked against a Data Vector (DV)

Figure 6:
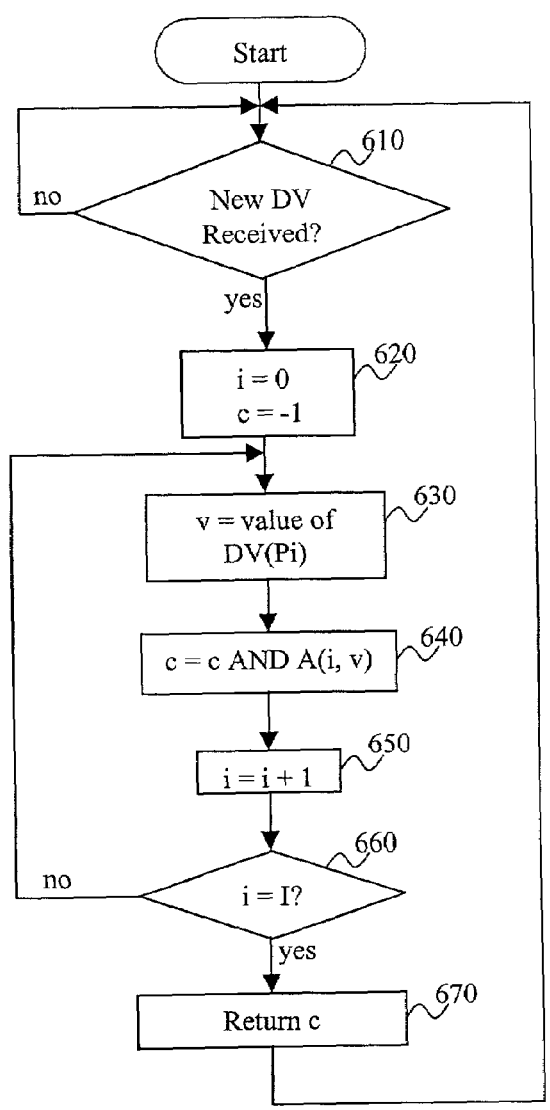
FIG. 6 is a flowchart illustrating an exemplary method checking a loaded rule table against a data vector (DV)

Once the RT 100 has been loaded with one or more rule vectors (e.g., $RV_0$, $RV_1$, $RV_2$, etc.), the rule table may be checked to determine whether a received data vector (DV) has a corresponding rule vector (RV). It should also be noted that the DV and the RV will typically contain an identical number of parameters. That is, the RT 100 may be checked to determine whether a rule vector exists for a particular DV. FIG. 6 illustrates one method for conducting this type of rule checking.

In FIG. 6, at the first operation 610, the system waits for a DV to be received so that further processing may occur. Once a DV has been received, an inner loop counter variable "i" is reset to "0," and a counter variable "c" is set to "−1." (Operation 620). The counter variable "i" permits the system to cycle through each row of the rule table. The "−1" notation is commonly used to indicate that the variable "c" is set to a series of logical 1's over the entire bit-field range of this variable (e.g., c="1111").

Control then flows to operation 630, which is the first operation controlled by the inner loop variable "i." In this operation, a variable "v" is set equal to the value associated with the $i^{th}$ parameter of the DV (i.e., $v=DV(P_i)$).

In the next operation 640, a bit-wise logical AND is performed between the content of the variable "c" and the content of the $v^{th}$ segment 120 of the $i^{th}$ row 110 (c AND A(i,v)). For example, if the initial value of variable "c" is "1111", and the value of A(i, v) is "0100", then the result of a bit-wise AND operation of these two elements would be "0100". The result of the logical AND operation is then placed into the variable "c" (c=c AND A(i,v)). Thus, in this example, "c" is set equal to "0100."

In operation 650, the row counter "i" in incremented by one (i=i+1), which leads to operation 660 where the variable "i" and the constant "I" are compared. This comparison determines whether processing has occurred for each of the rows 110 in the RT 100. While "i" is smaller than the maximum number of rows 110 in the RT 100 (i<I), the inner loop is continued and control is passed to operation 630. However, once the value of "i" is equal to "I" (i.e., each row has been processed), control is passed to operation 670.

In operation 670, the value of "c" is returned to the calling system, and control is passed back to operation 610 where the system waits for the next DV.

A specific, non-limiting example of checking a data vector (DV) against a loaded rule table will now be described. This description will be made with reference to the RT 100 shown in FIG. 5, which has been loaded with rule vectors $RV_0$, $RV_1$, and $RV_2$ in accordance with the method shown in FIG. 2. In this example, the following exemplary received value vector $DV_0$ will be used:

$DV_0$=1.1.1.5.4.3.1.1.5

Referring now to the flowchart in FIG. 6, an exemplary method of checking a DV against the loaded RT 100 will now be described.

In operation 610, the system waits to receive a new DV. If a new DV has not been received, then control remains at this operation. However, once a DV is received, control will flow to operation 620.

In operation 620, the inner loop counter "i" is set to "0", while variable "c" is set to "-1" (i.e., c="1111"). Next, during a first iteration of an inner loop, the value of $DV_0(P_0)$ is determined and placed in variable "v" (operation 630). In the current example, the execution of this operation results in "v" having the value "1." Therefore, the value denoted by A(i,v) is the value located in the RT 100 at A(0,1), which is "0100." That is, as shown in FIG. 5, the value located at the second segment 120 (v=1) of the first row 110 (i=0) is "0100."

Next, in operation 640, the logical operation "1111" AND "0100" is performed, which results in "c" having the value "0100". The row counter "i" is then incremented by one (operation 650), and then compared with the constant "I" to determined if any additional rows 110 are present (operation 660). In the present example, additional rows exist, so control is passed back to operation 630.

In operation 630, the variable "v" is set to the value of the second parameter of $DV_0$ is obtained (v=value of $DV_0P_1$)). Since v=$DV_0(P_1)$ is "1", the content of the segment A(i,v)= (A(1,1))="0100." In the next operation 640, the logical operation c AND A(1,1) (i.e., "0100" AND "0100") is performed, which results in "c" having a value of "0100."

The operations 630 through 660 are then performed for each of remaining rows of the rule table (i.e., these operations are performed for each parameter of the data vector). While cycling through each parameter of the data vector, the counter variable "i" will have been incremented to "7." At this point, $DV_0(P_7)$ is a "1" (i.e., the seventh value in the string "1.1.1.5.4.3.1.1.5"), which correlates to the corresponding value segment A(7,1)="1100." When "1100" is ANDed with the content of "c", which is "0100" (operation 640), the result will be placed in "c." In the current example, this would result in setting "c" to "0100."

Once again, operations 630 through 660 will be performed for each of remaining rows of the data vector. Thus, in the present example, two additional rows will be processed. Once these final two rows have been processed, the final value for "c" is "0100", which indicates that $DV_0$ corresponds to the second rule defined in the RT 100. In particular, the $DV_0$ corresponds to the second rule because the second bit position of the variable "c" equals a "1."

To further illustrate the capabilities of the present invention, rule checking the RT 100 with another received data vector ($DV_1$) will now be discussed. In this example, the $DV_1$ will have the value:

$DV_1$=1.0.1.5.4.3.1.1.5

It should be noted that, in this example, only the second parameter $DV_1(P_1)$ is different from that of $DV_0$ (0 versus 1 respectively). Referring again to FIG. 6, operation 610, the system waits to receive a new DV. In the current example, a new DV has been received ($DV_1$), so control will flow to operation 620.

Once again, in operation 620, the inner loop counter "i" is set to "0", while variable "c" is set to "-1" (i.e., c="1111"). Next, during a first iteration of an inner loop, the value of value of $DV_1(P_0)$ is determined and placed in variable "v" (operation 630). In the current example, the execution of this operation results in "v" having the value "1." Therefore, the value denoted by A(i,v) is the value located in the RT 100 at A(0,1), which is "0100." That is, as shown in FIG. 5, the value located at the second segment 120 (v=1) of the first row 110 (i=0) is "0100."

Next, in operation 640, the logical operation "1111" AND "0100" is performed, which results in "c" having the value "0100". The row counter "i" is then incremented by one (operation 650), and then compared with the constant "I" to determined if any additional rows 110 are present (operation 660). In the present example, additional rows exist, so control is passed back to operation 630.

In operation 630, the value of the second parameter of $DV_1$ is obtained (v=value of $DV_1(P_1)$). Thus, since v=$DV_1(P_1)$="0", the content of that segment is "0000" (A(1, 0)="0000"). In the next operation 640, the logical operation "0100" AND "0000" is performed, which results in "c" having a value of "0000."

Once again, operations 630 through 660 will be performed for each of the remaining data vector ($DV_1$) parameters. Thus, in the present example, seven additional rows will be processed (i.e., 1.5.4.3.1.1.5). Once these parameters have been processed, the final value for "c" will be "0000", which indicates that no applicable rules exist in the RT 100 for this particular data vector (DV). It should be understood, as illustrated in these examples, that the determination of whether or not a particular rule applies to a received DV is bound by the number of parameters of the RV.

Extended Rule Table Having "Don't Care" Segments

In another embodiment, the present invention may be configured to process situations where a parameter $P_i$ is a "don't care." For example, as far as the comparison between a rule vector and a data vector is concerned, this embodiment permits the use of a "*" rather than a specific value for a $P_i$ of a rule vector.

Similarly to the other embodiments of the present invention, this embodiment also may be performed by a computer system having standard computer components, such as a central processing unit (CPU), memory, and the necessary interface to permit system input/output. A portion of the system memory may be allocated for the creation of a Extended Rule Table (ERT). The ERT may be constructed as a two dimensional memory array where the size of the array may be modified to accommodate any computer memory restrictions or limitations. The memory array size also may be defined or modified by a user.

Figure 7:
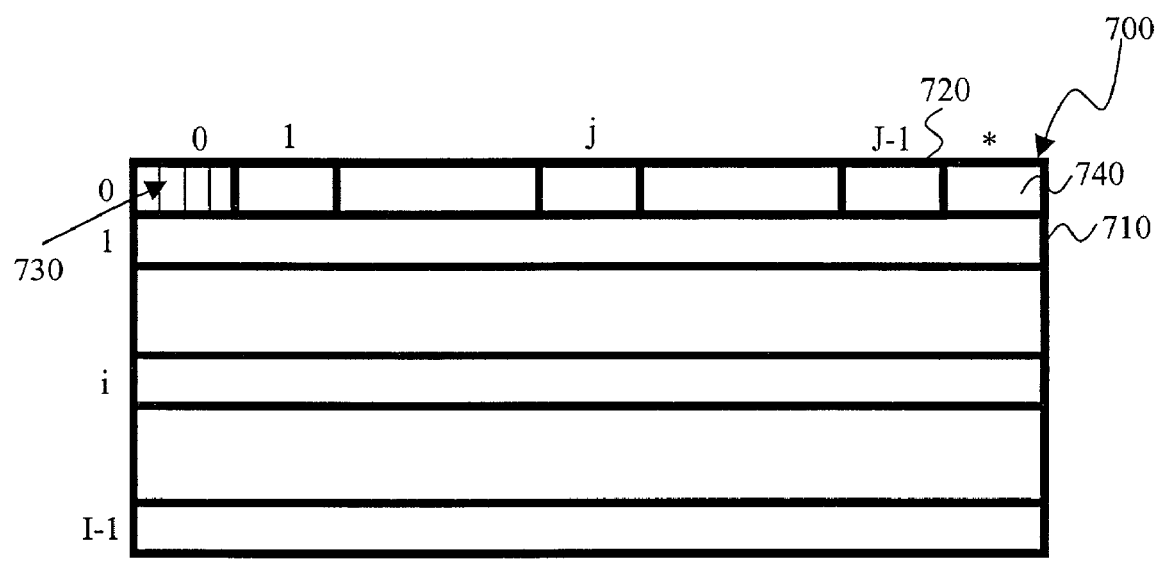
FIG. 7 is a diagram illustrating an enhanced rule table (ERT) having (I) parameters, (J) values, (R) rules, and configured to accept "don't care" cases.

FIG. 7 shows a two-dimensional RT 700, comprising a predefined number of rows 710 to store components of the RVs. Each row 710 is divided into value segments 720, each representing one possible value for a component of an RV. Each value segment 720 is further divided into a field of bits, each bit 730 representing a portion of one rule. In contrast to the RT 100, the RT 700 contains an additional value segment 740. This additional segment is labeled with a star "*" and is denoted as a star segment 740, which is used to denote a "don't care" value for the specific parameter. In a system utilizing an ERT 700 having a maximum of "I" rows, "J" value segments and "R" rules will result in a memory requirements of I*(J+1)*R bits for the ERT, or I*(J+1)*R/8 bytes, since each byte contains 8 bits.

Loading Rules into an Extended Rule Table (ERT)

Loading an extended rule table may be performed by using the method shown in FIG. 2. However, when the value of a parameter Pi is a "*", then the "star" segment of the corresponding row is set at the bit position 730 corresponding to the current rule number "r."

In one embodiment, the extended rule table may be implemented in a service aware network (SAN) where the rules are defined with respect to tuples that may be flowing through the network. For example, FIG. 8 shows an exemplary tuple 800 structure having five separate parameters. The parameters include the source IP address 805, destination IP address 810, protocol field 820, source port 830, and a destination port 840. Although each of the fields 805 through 840 may be used as a parameter, it may be beneficial to divide the relatively large 32 bit and 16 bit fields into smaller fields of 8-bits each, for example. Although this approach will limit the values to a range of 0 through 255 and result in some increase in the number of parameters, it will also decrease the overall size of the RT, an example of which is provided below.

The specific number and size of the parameters may be modified based on system requirements, such as a CPU cache structure, memory utilization, and memory speed, for example. One implementation of the present invention may be used to replace the content addressable memory described in U.S. patent application Ser. No. 09/547,034, entitled "A METHOD AND APPARATUS FOR WIRE-SPEED APPLICATION LAYER CLASSIFICATION OF DATA PACKETS", filed Apr. 11, 2000, and assigned to a common assignee, the entire disclosure of which is incorporated herein by reference.

Another implementation of the present invention may be used in conjunction with the system disclosed in U.S. patent application Ser. No. 09/541,598, entitled "AN APPARATUS FOR WIRE-SPEED CLASSIFICATION AND PRE-PROCESSING OF DATA PACKETS IN A FULL DUPLEX NETWORK", filed Apr. 3, 2000, now U.S. Pat. No. 6,831,893, issued on Dec. 14, 2004, and in U.S. patent application Ser. No. 09/715,152, entitled "AN APPARATUS AND METHOD FOR BUNDLING ASSOCIATED NETWORK PROCESS FLOWS IN SERVICE AWARE NETWORKS", filed Nov. 11, 2000, both of which are assigned to a common assignee, and are herein incorporated by reference.

Referring now to FIG. 9, an exemplary extended rule table (ERT) 700 is shown having a plurality of rows 710, segments 720, and rule bits 730. In this configuration, the ERT 700 has five rows 710, which correspond to the parameters $P_0$, $P_1$, $P_2$, $P_3$, $P_4$ in the tuple RV 800. The five rows 710 are labeled 0 to 4. The ERT 700, in this example, includes a total of 256 segments and are labeled as segments 0 through 255. In contrast to the rule table shown in FIG. 1, the ERT 700 includes a star value segment 740, which may be utilized for the "don't care" values. Each individual segment 720 and 740, in this particular example, is divided into three rules, which are labeled 0 to 2. Thus, each segment 720 and 740 in the extended rule table has three rule bits 730 labeled 0 to 2, and each of these rule bits 730 are capable of having a logical value of "0" or "1". For simplicity, blank cells in the ERT 700 identify a logical value of "0".

Loading "Don't Care" Rules into Extended Rule Table

A non-limiting illustration of one aspect of the present invention that provides a rule loading method that utilizes "don't cares," the loading of rule values into an ERT 700 will be demonstrated using the following exemplary rules, $RV_0$, and $RV_1$:

$RV_0$=0.*.2.3.4

$RV_1$=1.254.*.255.*

In one implementation, the method illustrated in FIG. 2, modified to accommodate "don't care" values, is used to load the rule values, denoted by $RV_0$, which results in the rule table shown in FIG. 9. For clarity, since loading of rule values into a rule table has been previously described, some of the details of loading the $RV_0$ into the RT 700 have been omitted.

Referring now to FIG. 2, rule table loading is initiated by performing operations 200–220. Next, in operation 230, the value of variable "r" is set to "0" since this is the first available rule number. Next, in operation 240, the value vector counter "i" is reset to "0." Control then flows to operation 250, which is the first operation in the inner loop controlled by the vector counter "i." In operation 250, the variable "v" is set to the $i^{th}$ parameter (i.e., $P_0$) of the $RV_0$. At this point "i" is set to "0", "v" is set to "0", and "r" is set to "0."

In operation 260, the identified bit location in the RT 700, denoted by A(i,v,r), is set to a logical "1." In the current example, A(0,0,0) is set to a logical "1." Put another way, the first parameter of $RV_0$, which is $P_0$, results in setting a bit to "1" in the first row 110 (row 0), in the first segment 120 (segment "0" (i.e., $P_0$="0")) of the $RV_0$. Also, the first bit of the three bit rule field is used since this is the first rule (i.e., the subscript of the $RV_0$ is "0").

In operation 270, the vector value counter "i" is incremented by one and then checked to determine if any additional parameters $P_1$ remain in the $RV_0$ (operation 280). In the current example, four additional vectors remain in $RV_0$ (*.2.3.4), so control passes back to operation 250 so that the next parameter $P_1$ ("*") may be loaded into the RT 700.

Returning to operation 250, the second parameter $P_1$ of $RV_0$ is processed by executing the operations 250 through 280. The completion of these operations results in setting a bit to a logical "1" in the second row 110 (row "1"), in the "don't care" segment 740 ("*") of the RT 700. The "don't care" segment 740 is used since the value of $P_1$ is a "*", representing a "don't care," and the second row 110 is used since this is the second parameter $P_1$ in the $RV_0$. Once again, the first bit of the three bit rule field is used since this is the first rule (i.e., the subscript of the $RV_0$ is "0"). This process of setting the appropriate rule bits in the RT 700 is continued by cycling through operations 250 through 280 for each of the parameters in the $RV_0$. Once completed, the RT 700 will be loaded with the $RV_0$ parameters. FIG. 9 shows an example of a rule table loaded with the $RV_0$ rule vector.

Control is then transferred back to operation 210, where the system determines whether a new RV is available. In the current example, the next rule vector ($RV_1$) is available, and since space is available in the RT 700 (operation 220), the rule incrementing variable "r" is then set to "1". Similarly to the method used to load $RV_0$, the RT 700 is loaded with the value vectors contained in $RV_1$ (i.e., "1.254.*.255.*") by cycling through operations 250 through 280. Upon exiting conditional operation 280, the RT 700 will be loaded with rule parameters $RV_0$ and $RV_1$. FIG. 10 shows an example of a rule table loaded with the $RV_0$ and $RV_1$ rule vectors. It is notable that the extended rule table shown in FIG. 10 includes two additional "don't care" values after the loading of the $RV_1$ rule vector.

Extended Rule Table Checked against a Data Vector (DV)

One embodiment of the present invention provides for the checking of a data vector (DV) against a loaded extended rule table. To illustrate this embodiment, the ERT 700, which has been loaded with rule vectors RV.sub.0 and RV.sub.1 will be used. Also, the DV checking will be described with reference to FIG. 11.

Figure 11:
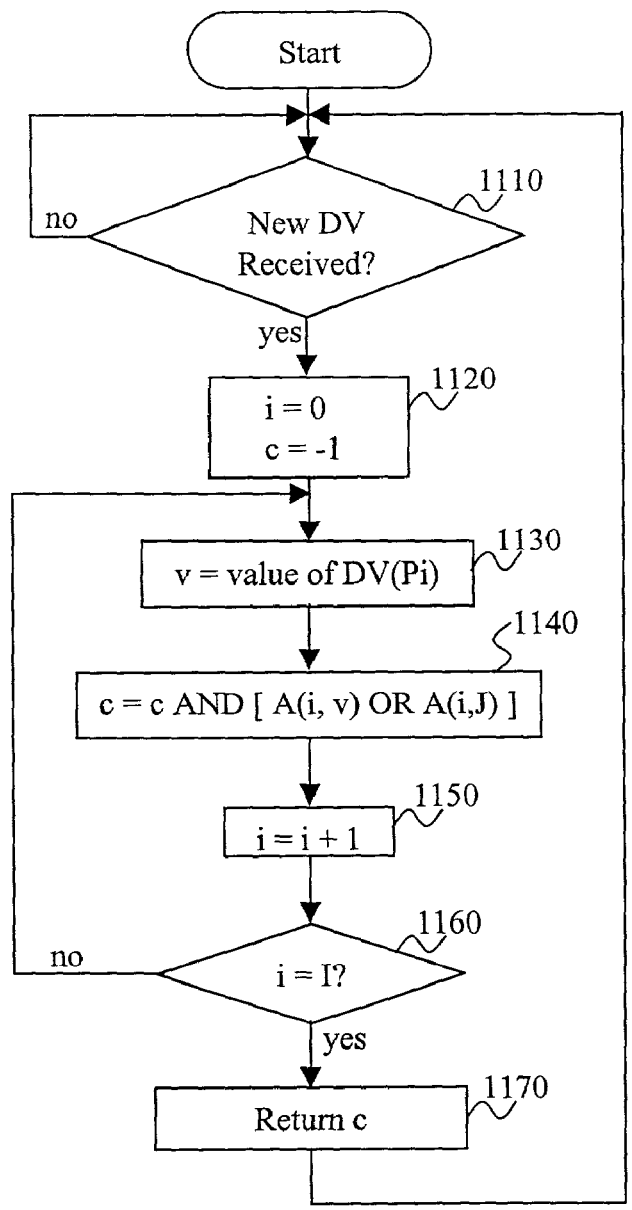
FIG. 11 is a flowchart illustrating an exemplary method checking a loaded enhanced rule table against a data vector (DV)

Because of the similarities of the rule tables shown in FIGS. 1 and 7, some of the rule checking methods that may be used for a RT 100 also may be used for the RT 700. In other words, some of the rule checking methods illustrated in FIG. 6 for the RT 100 also may be used for the RT 700. More particularly, operations used for the ERT 700 (FIG. 11, operations 1110 through 1130, and 1150 through 1170) correspond to the operations used for the ERT 100 (FIG. 6, operations 610 through 630, and 650 through 670). However, one notable difference between these methods is shown in FIG. 11. In this figure, operation 1140 is changed to reflect the use of the "don't care" operation utilized by the ERT 700. Specifically, in operation 1140, the value corresponding to the value contained in the segment pointed to by the respective parameter of a received DV, is logically ORed with the value contained in the "star" segment of the same row.

For example, if a specific segment contains "0000" and the "star" segment contained "0100", the result of a bit-wise logical OR operation would be "0100." The result of this OR operation would then be ANDed with the value of the "c" variable. In other words, once the logical OR operation is performed, processing continues to utilize a logical AND operation in this operation, as described in reference to FIG. 6, operation 640.

Loaded Extended Rule Table Checked against Data Value Example

To illustrate the ability of the present invention to utilize a "don't care" situation, a non-limiting, specific example of checking a data vector (DV) against the ERT 700 will now be described. This description will be made with reference to the RT 700 shown in FIG. 10, which has been loaded with rule vectors $RV_0$, and $RV_1$ in accordance with the method shown in FIG. 2. In this example, the following exemplary value vector $DV_0$ will be used:

$DV_0$=0.4.2.3.4

In FIG. 11, at the first operation 1110, the system waits for a new DV. If a new DV has not been received, then control remains at this operation. However, once a DV is received, then control will flow to operation 1120. In operation 1120, the inner loop counter variable "i" is reset to "0", while the variable "c" is initialized to "−1" (i.e., c=111). Next, during a first iteration of an inner loop, the value of $DV_0$ ($P_0$) is determined and placed in variable "v" (operation 1130). In the current example, since $P_0$="0", the execution of this operation results in "v" having the value "0."

In operation 1140, two separate operations are performed. First, the DV segment value and the "star" segment value are logically ORed. That is, the value of A(i,v) is ORed with the value of A(i,J). The second operation performed in this operation is a logical AND between the variable "c" and the result of the logical OR operation.

In the current example, the corresponding value of the value segment A(i,v) (i.e., the value of A(0,0), is "100", while the corresponding value of the "star" segment A(i, J) (i.e., A(0,256)) is "000." Thus, in performing the first operation of operation 1140, "100" is ORed with "000", resulting in the value "100." In performing the next operation, the variable "c" is ANDed with the result of the logical OR operation. Since variable "c" has a current value of "111" (because of the initialization performed in operation 1120), "111" is ANDed with "100." The result of this second operation is "100", which is placed in the variable "c."

Control is then passed to operation 1150 where the row counter "i" is incremented and control is then passed to a check operation that determines whether additional rows are to be processed (operation 1160). In the current example, additional rows are to be processed so control returns to operation 1130.

During a second iteration of the inner loop, in operation 1130, the operations illustrated in operations 1130 and 1140 are performed based on the second parameter $P_1$ of the $DV_0$. In the current example, the second parameter of $DV_0$ ($P_1$) is "4", which has a corresponding segment value of "000" (i.e., A(1,4)="000"), while the "star" segment value for the same row is "100" (i.e., A(1,256)="100"). Thus, the first operation performed in operation 1140 is "000" being ORed with "100", resulting in "100." The next operation performed is a logical AND between "c" and the result of the logical OR operation.

Since variable "c" has a current value of "100" (because of the prior inner loop cycle), "100" is ANDed with "100." The result of this second operation is "100", which is placed in the variable "c." Once again, the rule checking process continues by cycling through operations 1150 and 1160, and since there are additional rows that need processing, control returns again to operation 1130.

During a third iteration of the rule checking method, the operations illustrated in operations 1130 and 1140 are performed based on the third parameter $P_2$ of the $DV_0$. In the current example, the third parameter of $DV_0$ ($P_2$) is "2", which has a corresponding value segment of "100" (i.e., A(2,2)="100"), while the "star" segment value for the same row is "010" (i.e., A(2,256)="010"). Thus, the first operation performed in this operation is "100" being ORed with "010", resulting in "110." The next operation performed is a logical AND between "c" and the result of the logical OR operations.

Since variable "c" has a current value of "100" (because of the prior inner loop cycle), "100" is ANDed with "110." The result of this second operation is "100", which is placed in the variable "c." Once again, the rule checking process continues by cycling through operations 1150 and 1160, and since there are additional rows that are to be processed, control returns again to operation 1130.

Operations 1130 through 1150 will repeat until all the $DV_0$ parameters ("0.4.2.3.4") have been processed. In the current example, after all of the parameters of $DV_0$ have been processed, "c" will have a value of "100", which indicates that the received $DV_0$ corresponds to the first rule $RV_0$. In particular, the $DV_0$ corresponds to the first rule $RV_0$ because the first bit position of the variable "c" equals a "1."

One of ordinary skill will realize that the rule checking method described above may be modified in a variety of ways. For example, this rule checking method may be modified to identify a situation where rules do not exist in a particular rule table (i.e., there are no corresponding RVs and DVs). Another modification may be to add an additional procedure to operation 1140, for example, where "c" is checked for a "0" value (e.g., c="000"). In this modified operation 1140, if "c" is contains a "0" value, then there would be no need to continue checking any additional rows of the RT 700, so control could then be transferred to operation 1170, for example.

It is to be understood that in the present invention, the search time is bounded by the number of parameters in the rule vector, thus providing a significant advantage over traditional searching methods. For example, traditional systems typically experience a dramatic increase in search time as the number of parameters increase, which is not the case in this aspect of the present invention.

Rule Table Having a Range of Values

Several methods for rule table loading and checking have been described utilizing rule vectors having a single value, but the present invention is not so limited. For example, situations may occur where a user may wish to load, and subsequently check, a rule table having parameters with a range of values, rather then a single value. One type of situation where a range of values may be useful is in a system that processes color pixel information. For example, pixel color may be determined by three parameters, red, green and blue, wherein each of these parameters has a value ranging from 0 to 255. An exemplary rule vector (RV) that can accommodate this situation may have the following format:

$$RV=P_{red}.P_{green}.P_{blue}$$

FIGS. 13 and 14 show an exemplary rule table (RT) that may be used to accommodate pixel color situation. The RT may be configured with three rows, one for each parameter (red, green, blue), with 256 segments in each row. The number of bits in each segment will typically depend on the maximum number of rules utilized by the system. For example, one may wish to define a particular rule for determining whether or not a color is red. This rule would indicate that a particular color is red if the range of the red component is between 200 and 255, the green component is between 0 and 50, and the blue component is between 0 and 50. An exemplary rule vector have a range of values may utilize the following format:

$$RV_{red}=200-255.0-50.0-50$$

However, it should be understood that since each RV typically must have a specific value in each place, these types of RVs may have to be preprocessed so that they may be utilized in a standard rule table. For example, $RV_{red}$ could be divided into a series of rule vectors, as illustrated by the following rule vectors:

$$RVa=200.0.0$$

$$RVb=201.0.0$$

Utilizing this type of rule vector format would result in the very last rule vector having the following format:

$$RVz=255.50.50$$

Utilizing the above-described rule vector format would result in no fewer than 145,656 rules (i.e., (255–200+1)* (50–0+1)*(50–0+1)). To implement this type of rule vector format, a sub-rule map table (SMT) may be used to map the sub-rules to the original rule that has created them. During rule checking, when a match is found to a sub-rule (i.e., a match between a data vector and a rule vector) the SMT may be checked to identify the matching original rule. Since the creation of an appropriate SMT is well known in the art, it will not be further described in the specification.

It is to be realized that the rule table loading method described in FIG. 2 also may be used to load the "color" rule vector into a rule table. Furthermore, the rule table checking method shown in FIG. 6 may easily be modified to accommodate any necessary operations to check for the "color" RVs. It is also to be understood that rule checking for "color" rule vectors may utilize the "star" segment (i.e., "don't care") method illustrated in FIG. 11.

Modified Rule Table Having a Range of Values

The above method accommodates rule vectors having a range of values. More specifically, the method permits rule checking for pixel colors having three parameters, red, green and blue, each ranging in value from 0 to 255. Although this range of values aspect is described with respect to a "color pixel" implementation, the present invention is not so limited and may easily be modified.

For example, while the described range of values method may be utilized on a variety of computer systems, this method requires a large number of bits which may exceed the capacity, or requirements of some systems. To accommodate these systems, the present invention provides a modified method in which the bit requirements are significantly reduced while still providing for rule vectors having a range of values.

Figure 12:
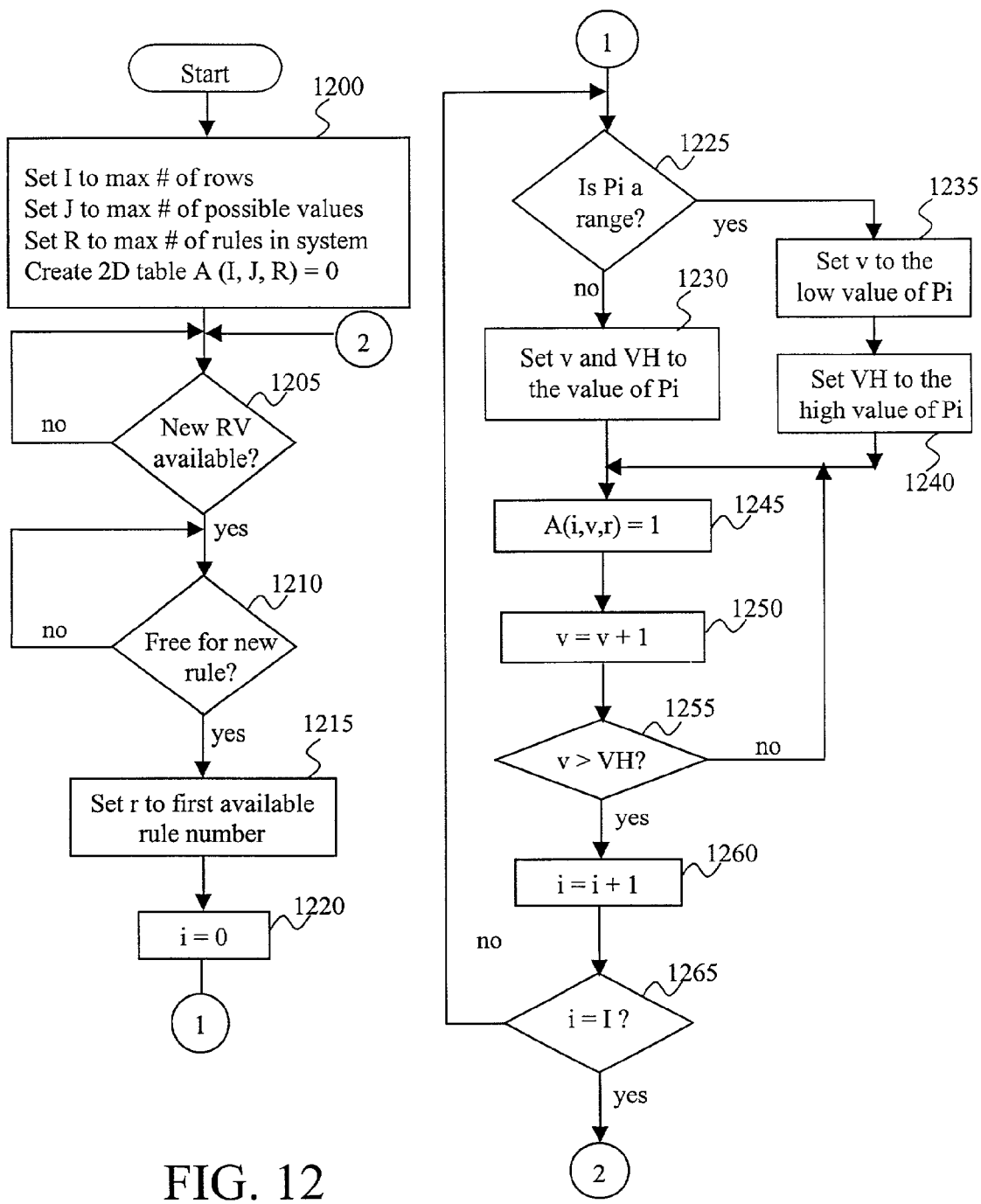
FIG. 12 is a flowchart illustrating an exemplary method for loading a rule vector having a range values into a rule table.

FIG. 12 shows an example of a modified rule loading method. It is to be realized that the rule table loading shown in FIG. 12 is similar to the methods used in FIG. 2. For example, in FIG. 12, operations 1200 through 1220, relate to FIG. 2, operations 200 through 240. Also, FIG. 12, operations 1260 and 1265 relate to FIG. 2, operations 270 and 280. For clarity, since these particular operations have been described with respect to FIG. 2, a detailed description is not provided for some of the operations shown in this figure. The method illustrated in FIG. 12 will now be discussed with reference to the loaded rule tables shown in FIGS. 13 and 14, as an example.

First, in FIG. 12, in operations 1200 through 1220, the rule table is initialized and then several checks are performed to determine RT availability. More detailed description of these operations can be found in the discussion relating to FIG. 2 since operations 1200 through 1220 correspond to operations 200 through 240.

Next, in operation 1225, the $i^{th}$ parameter $P_i$ is checked to determine whether it contains a single value or a range of values. If the parameter $P_i$ contains a range of values, control passes to operation 1235 where the variable "v" is set to the low value of the parameter $P_i$. Next, in operation 1240, the variable "VH" is set to the high value of $P_i$. Control then passes to operation 1245.

However, if at operation 1225 it was determined that the $i^{th}$ parameter $P_i$ contains a single value, execution would flow to operation 1230. In operation 1230, the variable "v" and the variable "VH" are set to the value contained in the parameter $P_i$. Once this operation is completed, control passes to operation 1245.

In operation 1245, which is a first operation of an inner loop, execution continues and a value assignment is made to the specific bit in the rule table "A" which corresponds to the $i^{th}$ row 110, at the $v^{th}$ value 120 and the respective $r^{th}$ rule bit(s) 130. Specifically, A(i,v,r) is assigned the bit value "1." It should be understood that the inner loop, which is bounded by the operations 1245 through 1255, assigns the necessary values throughout the range of values. That is, the appropriate value assignments are made for the entire value range, from the lower range to the upper range (e.g., v to VH).

Next, in operation 1250, the variable "v" is incremented by "1", which is followed by a check in operation 1255. In this operation, the value of "v" is compared against the value of "VH." If "v" is less than or equal to "VH", then execution of the inner loop continues and process control is passed to operation 1245. However, where the value of "v" is more than "VH", indicating that the entire range (e.g., v to VH) has been processed, control passes to operation 1260.

In operation 1260, the "i" counter variable is incremented by "1", and then checked in operation 1265 to determine if "i" has reached the maximum value "I." Again, "I" represents the maximum number of rows in the RT (or the maximum number of parameters $P_I$ in the RV). Thus, when "i" reaches the "I" value, all of the parameters of the RV have been processed. As long as "i" is smaller than "I", the sequence of operations 1225 through 1265 continue. However, once the value of "I" is reached, the system will exit out of the loop and continue execution at operation 1205, waiting for a new rule vector.

Loading and Checking a Rule Table Having (RGB) Rule Vectors

To illustrate the method shown in FIG. 12 for loading a rule table, the loading of several exemplary rule vectors (e.g., RGB) will now be discussed with reference to the loaded rule tables shown in FIGS. 13 and 14.

FIG. 13 shows a rule table that contains three parameters that correspond to the Red, Green and Blue components of an RGB signal. Each of these parameters is provided with a value between 0 and 255. Also, in this rule table, a maximum of three rules are specified. Accordingly, the size requirement of a rule table having this configuration is 3*256*3=2, 304 bits or 288 bytes.

In the current example, a user may define three separate rules to identify "red", "green" and "blue" according to the dominance of the color component, such that a "red" would have a high intensity of redness and so on. Accordingly, the loading of rule values into a rule table will be demonstrated using the following exemplary rule vectors:

$RV_{red}$=200–255.0–50.0–50

$RV_{green}$=0–50.200–255.0–50

$RV_{blue}$=0–50.0–50.200–255

FIG. 12 shows that the $RV_{red}$ may be loaded into a rule table by performing the initialization procedures illustrated operations 1200 through 1220, as described above.

Control then passes to operation 1225, which is the start of the first inner loop. In this operation, the $i^{th}$ parameter $P_0$ (or $P_r$) is checked to determine whether it contains a single value or a range of values. In the current example, the first parameter contains the range of values "200–255", which represents the "red" component of the $RV_{red}$ rule value. Since a range of values is present, control flows to operation 1235 where the variable "v" is set to the low range value "200." Next, in operation 1240, the variable "VH" to set to the high value "255." Control then passes to operation 1245 where A(i,v,r) (i.e., A("r", 200, "R")) is assigned the bit value "1."

Next, in operation 1250, the variable "v" is incremented by "1", which is followed by a check in operation 1255. In the current example, "v" is less than "VH", so execution of the inner loop continues and process control is passed to operation 1245. This inner loop will continue until "v" is greater than "VH", indicating that the entire range (e.g., 200–255) has been processed. At this point, control passes to operation 1260 where the counting variable "i" is incremented.

In the next operation 1265, counting variable "i" is checked to determine whether the "I" value has been reached. In the current example, "I" is equal to three (i.e., there are three rows corresponding to the red, green, and blue parameters $P_i$ of the vectors $RV_{red}$, $RV_{green}$, and $RV_{blue}$, in the RT). Thus, two additional rows still require loading, so control is passed back to operation 1225.

Returning to operation 1225, the incremented $i^{th}$ parameter $P_1$ (or $P_g$) of the rule vector $RV_{red}$ is checked to determine whether it contains a single value or a range of values. In the current example, this parameter contains the range of values "0–50", which represents the "green" component of the $RV_{red}$ rule vector. Again, a range of values is present so control flows to operation 1235.

In operation 1235, the variable "v" is set to the low range value "0", and in operation 1240, the variable "VH" to set to the high value "50." Control then passes to operation 1245 where A(i,v,r) (i.e., A("g", 0, "R")) is assigned the bit value "1."

Next, in operation 1250, the variable "v" is incremented by "1", which is followed by a check in operation 1255. In the current example, "v" is still less than "VH", so execution of the inner loop continues and process control is passed to operation 1245. This inner loop will continue until "v" is greater than "VH", indicating that the entire range (e.g., 0–50) has been processed. Once the range of values has been processed, control passes to operation 1260 where the counting variable "i" is incremented.

In the next operation 1265, counting variable "i" is checked to determine whether the "I" value has been reached ("I" is equal to three). Thus, one additional row still requires loading, so control is passed back to operation 1225.

Returning for a third time at operation 1225, the incremented $i^{th}$ parameter $P_2$ (or $P_b$) of the rule vector $RV_{red}$ is checked to determine whether it contains a single value or a range of values. In the current example, this parameter contains the range of values "0–50", which represents the "blue" component of the $RV_{red}$ rule vector. Once again, a range of values is present so control flows to operation 1235.

In operation 1235, the variable "v" is set to the low range value "0", and in operation 1240, the variable "VH" to set to the high value "50." Control then passes to operation 1245 where A(i,v,r) (i.e., A("b", 0, "R")) is assigned the bit value "1."

Next, in operation 1250, the variable "v" is incremented by "1", which is followed by a check in operation 1255. In the current example, "v" is still less than "VH", so execution of the inner loop continues and process control is passed to operation 1245. This inner loop will continue until "v" is greater than "VH", indicating that the entire range (e.g., 0–50) has been processed. Once the range of values has been processed, control passes to operation 1260 where the counting variable "i" is incremented.

In the next operation 1265, counting variable "i" is checked to determine whether the "I" value has been reached ("I" is equal to three). Since the "I" value has been reached (i.e., all rows have been loaded), control is passed back to operation 1205. FIG. 13 shows an example of a rule table loaded with the $RV_{red}$ rule vector.

In the current example, the next rule vector $RV_{green}$ is available. The $RV_{green}$ rule vector may be loaded into the rule table using the same method as was described to load the $RV_{red}$ rule vector (i.e., cycling through operations 1205–1265). Likewise, this same method may be used to load the $RV_{blue}$ rule vector. FIG. 14 shows an exemplary rule table loaded with all three rule vectors $RV_{red}$, $RV_{blue}$, and $RV_{green}$.

Check Data Vectors

To illustrate some of the additional capabilities of the present invention, a specific example of checking a DV against a rule values having a range of values will now be described. This description will be made with reference to the rule table shown in FIG. 14, which has been loaded with rule vectors $RV_{red}$, $RV_{blue}$, and $RV_{green}$ in accordance with the method shown in FIG. 12. In this example, the following exemplary received value vectors $DV_0$ and $DV_1$ will be used:

$DV_0$=255.255.255

$DV_1$=4.255.0

Referring now to the flowchart in FIG. 6, an exemplary method of checking a DV against a loaded RT will now be described. However, since rule checking using the method shown in this figure has previously described, some of the operations will be omitted from the following discussion.

In FIG. 6, at operation 620, the inner loop counter "i" is set to "0", while variable "c" is set to "−1" (i.e., c="111"). Next, during a first iteration of an inner loop, the value of the $I^{th}$ parameter $P_0$ of the $DV_0$ is determined and placed in variable "v" (i.e., v=$DV_0(P_0)$). (Operation 630). In the current example, the execution of this operation results in "v" having the value "255." Therefore, the value denoted by A(i,v) is the value located in the RT at A(0,255), which is "100." That is, as shown in FIG. 14, the value located at the last segment 120 of the RT (v=255) of the first row 110 (i=0) is "100."

Next, in operation 640, the logical operation "111" AND "100" is performed, which results in "c" having the value "100." The row counter "i" is then incremented by one (operation 650), and then compared with the constant "I" to determined if any additional rows 110 are present (operation 660). In the present example, as seen in FIG. 14, additional rows exist, so control is passed back to operation 630.

In operation 630, the variable "v" is set to the value of the second parameter $P_1$ of the $DV_0$ (i.e., v=$DV_0(P_1)$). Since $DV_0(P_1)$ is "255", the content of the segment A(I,v) is "010" (i.e., A(1, 255)="010"). In the next operation 640, the logical operation "100" AND "010" is performed, which results in "c" having a value of "000." Since one additional row exists, control is again passed back to operation 630.

Returning now to operation 630, the variable "v" is set to the value of the third parameter $P_2$ of the $DV_0$ (i.e., v=$DV_0(P_2)$). Since $DV_0(P_2)$ is "255", the content of the segment A(Iv) is "001" (i.e., A(2, 255)="001"). In the next operation 640, the logical operation "000" AND "001" is performed, which results in "c" again having a value of "000." Since no additional rows exist, the value of "c", which is "000", is returned to the system (operation 670). The "000" "c" value indicates that $DV_0$ does not correspond to any of the rules defined in the RT.

Rule checking the RT with another received data vector $DV_1$ will now be discussed. Once again processing reaches operation 620 where the inner loop counter "i" is set to "0", while variable "c" is set to "−1" (i.e., c="111"). Next, during a first iteration of an inner loop, the value of the first parameter $P_0$ of the $DV_1$ is determined and placed in variable "v" (operation 630). In the current example, the execution of this operation results in "v" having the value "4." Therefore, the value denoted by A(i,v) is the value located in the RT at the location A(0,4), which is "011." That is, as shown in FIG. 14, the value located at segment four of the RT (v=4) of the first row (i=0) is "011."

Next, in operation 640, the logical operation "111" AND "011" is performed, which results in "c" having the value "011". The row counter "i" is then incremented by one (operation 650), and then compared with the constant "I" to determine if any additional rows 110 are present (operation 660). In the present example, as seen in FIG. 14, additional rows exist, so control is passed back to operation 630.

In operation 630, the variable "v" is set to the value of the second parameter $P_1$ of the $DV_1$ (i.e., v=$DV_1(P_i)$). Since $DV_1(P_1)$ is "255", the content of that segment is "010" (A(1, 255)="010"). In the next operation 640, the logical operation "011" AND "010" is performed, which results in "c" having a value of "010." Since one additional row exists, control is again passed back to operation 630.

Returning once again to operation 630, the variable "v" is set to the value of the third parameter $P_2$ of the $DV_1$ (i.e., v=$DV_1(P_2)$). Since $DV_1(P_2)$ is "0", the content of that segment A(i, v) is "110" (i.e., A(2, 0)="110"). In the next operation 640, the logical operation "010" AND "110" is performed, which results in "c" having a value of "010." Since no additional rows exist, the value of "c", which is "010", is returned to the system (operation 670). The "010" value in "c" indicates that $DV_1$ corresponds with the second rule defined in the RT, and in this particular example, would be considered "green."

It would be understood by those skilled in the art that the invention can be extended to DVs containing a range of values.

Modified Extended Rule Table

It is to be realized that the above rule checking method may be modified to incorporate a modified extended rule table (MERT) that utilizes "don't care" situations. One application of this method is in performing rule checking to identify an IP tuple. In this case "don't care" values may be used instead of yet unknown values of an IP tuple. This, by a non-limiting example, can be useful when a process flow generates process flows where certain of the components of the tuple are known but not all of them. The unknown values can be replaced by a "don't care" value and substituted at a later time, when such unknown values become known.

Looking again at FIG. 8, a source IP address and a destination IP address are shown having 32 bits each, so they therefore provide values range from "0" to "$2^{32}-1$." This figure also shows the protocol type as an 8-bit field, and the source port and destination port are 16-bits each. While it may be impractical to create a rule table for the entire range of values, it is possible to divide each of the 8-bit fields into smaller segments. For example, each 8-bit field may be defined by a one byte segment. Therefore, the IP addresses may be 4 bytes each (4*8=32 bits), and the port addresses two bytes each. Each parameter may have a range from "0" to "255." The number of rows in the MERT will now expand from five rows, as shown in FIGS. 9 and 10, to thirteen rows, as shown in FIG. 15. This approach results in significant savings in the rule table size. More specifically, while the number of rows within the rule table is increased (i.e., from 5 to 13), the required number of total bits necessary to represent the rule table is significantly reduced. In the first case, the maximum number of rows is 5, the maximum value range is $2^{32}$, and N number of rules are allowed. Therefore the total memory requirement is $5*2^{32}*N$ bits. However, when more rows are used, as in the example above, the maximum number of rows is 13, the maximum value range is $2^8$, and N number of rules are allowed. Therefore the total memory requirement is $13*2^8*N$ bits, which results in a significantly smaller memory requirement.

Additional savings (e.g., reduction in bits required to represent the rule table, reduction in rule checking and loading, etc.) also may be achieved by utilizing the "don't care" method only where the full range of the original 32-bit or corresponding 16-bit parameter are represented in the MERT. One method for implementing this approach results in providing the "don't care" option once every four rows. FIG. 15 shows an exemplary MERT utilizing this approach. Specifically, blank rows 750 are used in rows zero through two, and in rows four through six. The "don't care" rows 710 are used in rows 3, 7, 10, and 12.

Modified Extended Rule Table (MERT) Data Vector (DV) Checking

To illustrate the checking of a data vector (DV) against a loaded modified extended rule table (MERT), reference will be made to the MERT rule table shown in FIG. 15. It is to be appreciated that the loading of the MERT may be accomplished by any of the previously described rule table loading methods (e.g., FIG. 2). For clarity, further description of rule loading into the MERT rule table is omitted.

Figure 16:
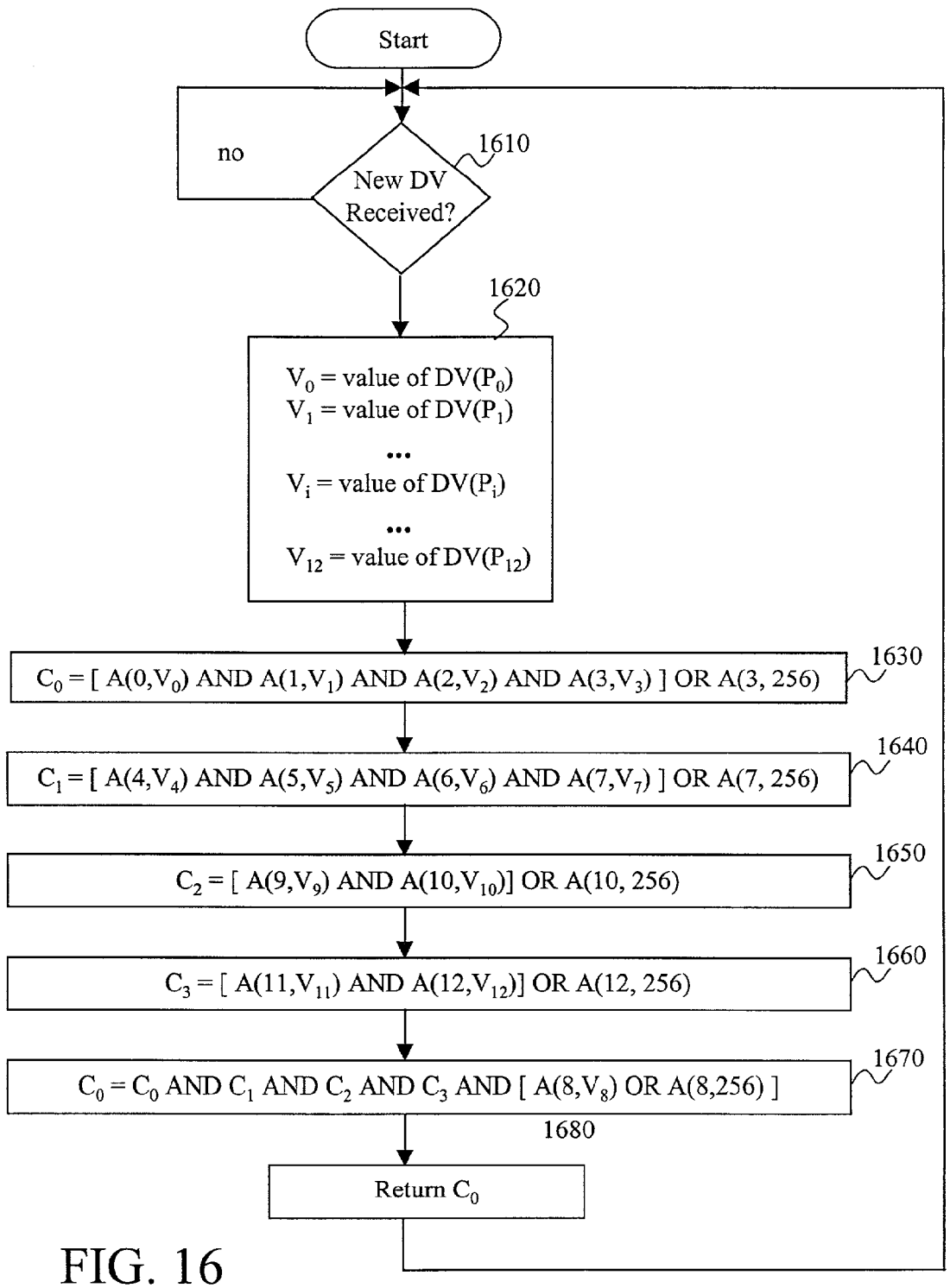
FIG. 16 is a flowchart illustrating an exemplary method for checking a loaded modified extended rule table (MERT) for a data vector (DV).

Referring now to the flowchart in FIG. 16, an exemplary method of checking a data vector (DV) against a loaded MERT will now be described. In FIG. 16, at operation 1610, the system is waiting for a new DV. When a new DV is received, control will flow to operation 1620. In operation 1620, each parameter of the DV is stored in a separate variable. Each of these storage variables are one byte long, for example, and are designated $V_1, V_2, V_i, \ldots V_{12}$. Upon the completion of operation 1620, the values contained in $DV_{1-12}$ will be stored in corresponding variables $V_{1-12}$. Once the DV's parameters are stored, process flows to operation 1630.

Operations 1630 and 1640 are similar procedures which may be utilized to calculate a series of logical AND/OR operations. The procedures performed in operation 1630 relate to the IP source address, while the procedures performed in operation 1640 relate to the IP destination address.

Looking first to operation 1630, $C_0$ is calculated by ANDing the content located at four separate segments within the MERT. Specifically, the content located at the segments $A(0,V_0)$, $A(1,V_1)$, $A(2,V_2)$ and $A(3,V_3)$ are ANDed together. The result of this ANDing is then ORed with the content located at $A(3,256)$. Put another way, this operation performs a logical AND operation on the content of the corresponding segments of each of the four rows (rows 0–3) and the result is logically ORed with the content of the "don't care" cell (cell "256" of the fourth row (row "3")). Once $C_0$ has been calculated, control flows to operation 1640.

In operation 1640, $C_1$ is also calculated by ANDing the content located at four separate segments within the MERT. The calculation of $C_1$ may be performed in a manner similarly to the method used to calculate $C_0$. That is, $C_1$ may be calculated by ANDing the content located at the segments $A(4,V_4)$, $A(5,V_5)$, $A(6,V_6)$ and $A(7,V_7)$. The result of this ANDing is then ORed with the content located at $A(7,256)$ (i.e., the "don't care" segment).

A similar process takes place in operations 1650 and 1660, but in these operations only two rows are ANDed together since each component denoted by these segments have only two bytes. For example, segments $A(9,V.\text{sub}.9)$ and $A(10,V.\text{sub}.10)$ may be used to represent the source port address, while segments $A(11,V.\text{sub}.11)$ and $A(12,V.\text{sub}.12)$ may be used to represent the destination port address.

As shown in operation 1650, $C_2$ is calculated by ANDing the $A(9,V_9)$ and $A(10,V_{10})$ segments, with the result of this ANDing being ORed with the content located at $A(10,256)$, which is the "don't care" segment. Once $C_2$ has been calculated, control flows to operation 1660.

In operation 1660, $C_3$ is calculated by ANDing the content located at the segments $A(11,V_{11})$ and $A(12,V_{12})$, and then ORing this result with the content located at the "don't care" segment $A(12,256)$.

Next, in operation 1670, a logical AND is performed between all the previously calculated components (i.e., $C_0$, $C_1$, $C_2$, $C_3$), and the result of the logical OR between the content of the segment corresponding to the value of the protocol type (i.e., $A(8, V_8)$) and the value of the "don't care" segment belonging to the same row (i.e., A(8,256)). This value (i.e., $C_0$) is returned in operation 1680 to the calling function, and the system returns to its waiting position for another DV to arrive.

The previous description of the preferred embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents thereof.

What is claimed is:

1. A computer-implemented method for checking a rule table, the method comprising:
  (a) providing a two dimensional rule table having a number of rows, wherein each of said rows comprises a number of segments, and wherein each of said segments comprises a number of positions;
  (b) storing rule vectors in said rule table, wherein said storing comprises:
    (i) utilizing a first variable as a rule number position pointer, a second variable as a row counter, and a third variable as a segment pointer;
    (ii) receiving a value of a parameter of a rule vector pointed to by said second variable, wherein said third variable is set to the received value;
    (iii) setting a bit in the rule table to a logical "1", wherein the bit is identified by a row pointed to by the second variable, at a segment pointed to by the third variable, and in a position pointed to by the first variable;
    (iv) increasing the value of the second variable by one; and
    (v) while the value of the second variable is smaller than the number of rows going to and continuing processing from operation (ii);
  (c) comparing a received data vector to at least one of the stored rule vectors; and
  (d) returning a rule number indicator if a match is found between said received data vector and at least one of the stored rule vectors.

2. The method according to claim 1, wherein prior to operation (b) (ii) said storing further comprises:
  (e) waiting for said rule vector of operation (b) (ii) to become available;
  (f) waiting for said rule table to have enough free space to store the rule vector;
  (g) setting said first variable to point to a next available rule number in said rule table;
  (h) setting said second variable to zero; and
  wherein after operation (b) (v), said storing further comprises:
    (vi) when the value of the second variable is equal to the number of rows, going to and continuing processing from operation (e).

3. The method according to claim 1, wherein said comparing comprises:
  (e) utilizing a fourth variable as a row counter, a fifth variable as a parameter pointer, and a sixth variable as a segment pointer;
  (f) receiving a value of a rule vector parameter pointed to by said fifth variable, wherein said sixth variable is set to said received value;

(g) performing a logical AND operation between said fifth variable and an identified segment in said rule table, wherein the identified segment is in a row pointed to by said fourth variable, and at a segment pointed to by said sixth variable;

(h) setting said fifth variable to the result of the logical AND operation;

(i) incrementing the value of said fourth variable by one; and (j) while the value of said fourth variable is smaller than the number of rows, going to and continuing processing from operation (f).

4. The method according to claim 3, wherein prior to operation (f), said method further comprising:

(k) waiting to receive said data vector; (l) setting said fourth variable to "0";

(m) setting said fifth variable to "−1"; and wherein after operation (j), said comparing further comprises:

(n) when the value of said fourth variable is equal to the number of rows, returning a value contained in said fifth variable and going to and continuing processing from operation (k).

5. The method according to claim 4, further comprising: determining if said fifth variable contains a logical value of "0" after performing the logical AND operation, and if so, returning the value contained in said fifth variable and going to and continuing processing from operation (k); otherwise going to and continuing processing from operation (f).

6. The method according to claim 1, wherein the number of rows in said rule table is determined by a number of parameters allowed by said stored rule vectors.

7. The method according to claim 6, wherein the number of said segments is determined by a maximum number of possible values for said rule vector parameters.

8. The method according to claim 7, said method further comprising: providing a range of values to each parameter of said rule vectors.

9. The method according to claim 7, wherein each of the number of positions comprises bits, and wherein the number of bits is determined by a maximum number of rules allowed by a rule checking system.

10. The method according to claim 1, wherein said received data vector is a network tuple utilized in a computer network system.

11. The method according to claim 10, wherein the number of rows in said rule table is determined by a number of parameters in said network tuple.

12. The method according to claim 10, wherein the number of rows in said rule table is determined by a number of bytes in said network tuple.

13. The method according to claim 10, wherein a length of each of the number of rows is determined by a length of one line of a cache memory.

14. The method according to claim 10, wherein a maximum number of parameters of each of said rule vectors is a number of parameters in a network tuple.

15. The method according to claim 10, wherein a maximum number of parameters of each of said rule vectors is a number of bytes in a network tuple.

16. The method according to claim 1, wherein said method is executed on a personal computer (PC).

17. The method according to claim 1, wherein said method is executed on a network processing computer.

18. The method according to claim 1, wherein said received data vector comprises tuple information, so that the comparing can be performed in a network to identify a tuple match with at least one of the stored rule vectors.

19. A rule table checking system that comprises:

an accessible memory; and a controller in communication with the accessible memory, wherein said controller is configured to provide rule table checking using a method comprising:

(a) providing a two dimensional rule table having a number of rows, wherein each of said rows comprises a number of segments, and wherein each of said segments comprises a number of positions;

(b) storing rule vectors in said rule table, wherein said storing comprises:

(i) utilizing a first variable as a rule number position pointer, a second variable as a row counter, and a third variable as a segment pointer;

(ii) receiving a value of a parameter of a rule vector pointed to by the second variable, wherein a third variable is set to the received value;

(iii) setting a bit in the rule table to a logical "1", wherein the bit is identified by a row pointed to by the second variable, at a segment pointed to by the third variable, and in a position pointed to by the first variable;

(iv) increasing the value of the second variable by one; and (v) while the value of the second variable is smaller than the number of rows, going to and continuing processing from operation (ii).

(c) comparing a received data vector to at least one of the stored rule vectors; and (d) returning a rule number indicator if a match is found between said received data vector and at least one of the stored rule vectors.

20. The system according to claim 19, wherein prior to operation (b) (ii) said storing further comprises:

(e) waiting for said rule vector of operation (b) (ii) to become available;

(f) waiting for said rule table to have enough free space to store the rule vector;

(g) setting said first variable to point to a next available rule number in said rule table;

(h) setting said second variable to zero; and wherein after operation (b) (v), said storing further comprises:

(vi) when the value of the second variable is equal to the number of rows, going to and continuing processing from operation (e).

21. The system according to claim 19, wherein said comparing comprises:

(e) utilizing a fourth variable as a row counter, a fifth variable as a parameter pointer, and a sixth variable as a segment pointer;

(f) receiving a value of a rule vector parameter pointed to by said fifth variable, wherein the sixth variable is set to said received value;

(g) performing a logical AND operation between said fifth variable and an identified segment in said rule table, wherein the identified segment is in a row pointed to by said fourth variable, and at a segment pointed to by said sixth variable;

(h) setting said fifth variable to the result of the logical AND operation;

(i) incrementing the value of said fourth variable by one; and (j) while the value of said fourth variable is smaller than the number of rows, going to and continuing processing from operation (f).

22. The system according to claim 21, wherein prior to operation (f), said method further comprising:
(k) waiting to receive said data vector;
(l) setting said fourth variable to "0";
(m) setting said fifth variable to "−1"; and
wherein after operation (j), said comparing further comprises:
(n) when the value of said fourth variable is equal to the number of rows, returning a value contained in said fifth variable and going to and continuing processing from operation (k).

23. The system according to claim 22, further comprising: determining if said fifth variable contains a logical value of "0" after performing the logical AND operation, and if so, returning the value contained in said fifth variable and going to and continuing processing from operation (k); otherwise going to and continuing processing from operation (f).

24. The system according to claim 19, wherein the number of rows in said rule table is determined by a number of parameters allowed by said stored rule vectors.

25. The system according to claim 24, wherein the number of said segments is determined by a maximum number of possible values for said rule vector parameters.

26. The system according to claim 25, said method further comprising: providing a range of values to each parameter of said rule vectors.

27. The system according to claim 25, wherein each of the number of positions comprises a bit, wherein the number of bits is determined by a maximum number of rules allowed by the rule checking system.

28. The system according to claim 19, wherein said received data vector is a network tuple utilized in a computer network system.

29. The system according to claim 28, wherein the number of rows in said rule table is determined by a number of parameters in said network tuple.

30. The system according to claim 28, wherein the number of rows in said rule table is determined by a number of bytes in said network tuple.

31. The system according to claim 28, wherein a length of each of the number of rows is determined by a length of one line of a cache memory.

32. The system according to claim 28, wherein a maximum number of parameters of each of said rule vectors is a number of parameters in a network tuple.

33. The system according to claim 28, wherein a maximum number of parameters of each of said rule vectors is a number of bytes in a network tuple.

34. The system according to claim 19, wherein said method is executed on a personal computer (PC).

35. The system according to claim 19, wherein said method is executed on a network processing computer.

36. The system according to claim 19, wherein said received data vector comprises tuple information, so that the comparing can be performed in a network to identify a tuple match with at least one of the stored rule vectors.

37. Computer software that is utilized in a rule table checking system, the software comprising:
a computer accessible medium having software instructions; and
wherein said software instructions provide rule table checking using a method comprising:
(a) providing a two dimensional rule table having a number of rows, wherein each of said rows comprises a number of segments, and wherein each of said segments comprises a number of positions;
(b) storing rule vectors in said rule table, wherein said storing comprises:
(i) utilizing a first variable as a rule number position pointer, a second variable as a row counter, and a third variable as a segment pointer;
(ii) receiving a value of a parameter of a rule vector pointed to by the second variable, wherein a third variable is set to the received value;
(iii) setting a bit in the rule table to a logical "1", wherein the bit is identified by a row pointed to by the second variable, at a segment pointed to by the third variable, and in a position pointed to by the first variable;
(iv) increasing the value of the second variable by one; and
(v) while the value of the second variable is smaller than the number of rows, going to and continuing processing from operation (ii);
(c) comparing a received data vector to at least one of the stored rule vectors; and
(d) returning a rule number indicator if a match is found between said received data vector and at least one of the stored rule vectors.

38. The software according to claim 37, wherein prior to operation (b) (ii) said storing further comprises:
(e) waiting for said rule vector of operation (b) (ii) to become available;
(f) waiting for said rule table to have enough free space to store the rule vector;
(g) setting said first variable to point to a next available rule number in said rule table;
(h) setting said second variable to zero; and
wherein after operation (b) (v), said storing further comprises:
(vi) when the value of said second variable is equal to the number of rows, going to and continuing processing from operation (e).

39. The software according to claim 37, wherein said comparing comprises:
(e) utilizing a fourth variable as a row counter, a fifth variable as a parameter pointer, and a sixth variable as a segment pointer;
(f) receiving a value of a rule vector parameter pointed to by said fifth variable, wherein said sixth variable is set to said received value;
(g) performing a logical AND operation between said fifth variable and an identified segment in the rule table, wherein the identified segment is in a row pointed to by said fourth variable, and at a segment pointed to by said sixth variable;
(h) setting said fifth variable to the result of the logical AND operation;
(i) incrementing the value of said fourth variable by one; and
(j) while the value of said fourth variable is smaller than the number of rows, going to and continuing processing from operation (f).

40. The software according to claim 39, wherein prior to operation (f), said method further comprising:
(k) waiting to receive said data vector, (l) setting said fourth variable to "0";
(m) setting said fifth variable to "−1"; and
wherein after operation (j), said comparing further comprises:

(n) when the value of said fourth variable is equal to the number of rows, returning a value contained in said fifth variable and going to and continuing processing from operation (k).

41. The software according to claim 40, further comprising: determining if said fifth variable contains a logical value of "0" after performing the logical AND operation, and if so, returning the value contained in said fifth variable and going to and continuing processing from operation (k); otherwise going to and continuing processing from operation (f).

42. The software according to claim 37, wherein the number of rows in said rule table is determined by a number of parameters allowed by said stored rule vectors.

43. The software according to claim 42, wherein the number of said segments is determined by a maximum number of possible values for said rule vector parameters.

44. The software according to claim 43, said method further comprising: providing a range of values to each parameter of said rule vectors.

45. The software according to claim 43, wherein each of the number of positions a comprises bits, and wherein the number of bits is determined by a maximum number of rules allowed by the rule checking system.

46. The software according to claim 37, wherein said received data vector is a network tuple utilized in a computer network system.

47. The software according to claim 46, wherein the number of rows in said rule table is determined by a number of parameters in said network tuple.

48. The software according to claim 46, wherein the number of rows in said rule table is determined by a number of bytes in said network tuple.

49. The software according to claim 46, wherein a length of each of the number of rows is determined by a length of one line of a cache memory.

50. The software according to claim 46, wherein a maximum number of parameters of each of said rule vectors is a number of parameters in a network tuple.

51. The software according to claim 46, wherein a maximum number of parameters of each of said rule vectors is a number of bytes in a network tuple.

52. The software according to claim 37, wherein the rule checking system is a personal computer (PC).

53. The software according to claim 37, wherein the rule checking system is a network processing computer.

54. The software according to claim 37, wherein said received data vector comprises tuple information, so that the comparing can be performed in a network to identify a tuple match with at least one of the stored rule vectors.

55. A computer-implemented method for checking a rule table having stored rule vectors, the method comprising:
(a) providing a two dimensional rule table having a number of rows, wherein each of said rows comprises a number of segments, and wherein each of said segments comprises a number of positions;
(b) comparing a received data vector to at least one stored rule vector, wherein said comparing comprises:
(i) utilizing a first variable as a row counter, a second variable as a parameter pointer, and a third variable as a segment pointer;
(ii) receiving a value of a rule vector parameter pointed to by said second variable, wherein said third variable is set to said received value;
(iii) performing a logical AND operation between said second variable and an identified segment in the rule table, wherein the identified segment is in a row pointed to by said first variable, and at a segment pointed to by said third variable;
(iv) setting said second variable to the result of the logical AND operation;
(v) incrementing the value of said first variable by one; and
(vi) while the value of said first variable is smaller than the number of rows, going to and continuing processing from operation (ii); and
(c) returning a rule number indicator if a match is found between said received data vector and at least one of the stored rule vectors.

56. The method according to claim 55, wherein prior to operation (b) (ii), said method further comprises:
(d) waiting to receive said data vector;
(e) setting said first variable to "0";
(f) setting said second variable to "−1"; and
wherein after operation (b) (vi), said comparing further comprises:
(vii) when the value of said first variable is equal to the number of rows, returning a value contained in said second variable and going to and continuing processing from operation (d).

57. The method according to claim 56, further comprising: determining if said second variable contains a logical value of "0" after performing the logical AND operation, and if so, returning the value contained in said second variable and going to and continuing processing from operation (d); otherwise going to and continuing processing from operation (b) (ii).

58. The method according to claim 55, wherein the number of rows in said rule table is determined by a number of parameters allowed by said stored rule vectors.

59. The method according to claim 58, wherein the number of said segments is determined by a maximum number of possible values for said rule vector parameters.

60. The method according to claim 59, said method further comprising: providing a range of values to each parameter of said rule vectors.

61. The method according to claim 59, wherein each of the number of positions comprises a bit, wherein the number of bits is determined by a maximum number of rules allowed by a rule checking system.

62. The method according to claim 55, wherein said received data vector is a network tuple utilized in a computer network system.

63. The method according to claim 62, wherein the number of rows in said rule table is determined by a number of parameters in said network tuple.

64. The method according to claim 62, wherein the number of rows in said rule table is determined by a number of bytes in said network tuple.

65. The method according to claim 62, wherein a length of each of the number of rows is determined by a length of one line of a cache memory.

66. The method according to claim 62, wherein a maximum number of parameters of each of said rule vectors is a number of parameters in a network tuple.

67. The method according to claim 62, wherein a maximum number of parameters of each of said rule vectors is a number of bytes in a network tuple.

68. The method according to claim 55, wherein said method is executed on a personal computer (PC).

69. The method according to claim 55, wherein said method is executed on a network processing computer.

70. The method according to claim 55, wherein said received data vector comprises tuple information, so that the comparing can be performed in a network to identify a tuple match with at least one of the stored rule vectors.

71. A computer-implemented method for checking an modified rule table, the method comprising:
(a) providing a two dimensional rule table having a number of rows, wherein each of said rows comprises a number of segments, wherein each of said segments comprises a number of positions, and wherein at least one of said segments comprise a "don't care" segment that identifies a "don't care" state;
(b) storing rule vectors in said rule table, wherein said storing comprises:
(i) utilizing a first variable as a rule number position pointer, a second variable as a row counter, and a third variable as a segment pointer;
(ii) receiving a value of a parameter of the rule vector pointed to by said second variable, wherein said third variable is set to the received value;
(iii) if a value of said third variable is a "don't care" designator, setting a bit pointed to by said first variable in said "don't care" segment to a logical "1"; otherwise, setting a bit in another segment of said rule table to a logical "1", wherein the bit is identified by a row pointed to by said second variable, at a segment pointed to by said third variable, and in a position pointed to by said first variable;
(iv) increasing the value of said second variable by one; and
(v) while the value of said second variable is smaller than the number of rows, going to and continuing processing from operation (ii);
(c) comparing a received data vector to at least one of the stored rule vectors; and
(d) returning a rule number indicator if a match is found between said received data vector and at least one of the stored rule vectors.

72. The method according to claim 71, wherein prior to operation (b)(ii), said storing further comprises:
(e) waiting for said rule vector to become available;
(f) waiting for said rule table to have enough free space to store said rule vector;
(g) setting said first variable to point to a next available rule number in said rule table; and
(h) setting said second variable to zero; wherein after operation (b) (v), said storing further comprises:
(vi) when the value of said second variable is equal to the number of rows, going to and continuing processing from operation (e).

73. The method according to claim 71, wherein the "don't care" designator is an asterisk ("*").

74. The method according to claim 71, wherein said comparing comprises:
(e) utilizing a fourth variable as a row counter, a fifth variable as a parameter pointer, and a sixth variable as a segment pointer;
(f) receiving a value of a rule vector parameter pointed to by said fifth variable, wherein said sixth variable is set to the received value;
(g) performing a logical OR operation between a rule table content and a "don't care" segment content, wherein said rule table content is defined by content of a segment that is in a row pointed to by said fourth variable, and in a segment pointed to by said sixth variable, and wherein said "don't care" content is defined by the content of said "don't care" segment that is in a row pointed to by said fourth variable; (h)

performing a logical AND operation between the result of said OR operation and said fifth variable;
(i) setting said fifth variable to the result of the logical AND operation;
(j) incrementing the value of said fourth variable by one; and
(k) while the value of said fourth variable is smaller than the number of rows, going to and continuing processing from operation (f).

75. The method according to claim 74, wherein prior to operation (e), said comparing further comprises: (l) waiting to receive said data vector;
(m) setting said fourth variable to "0";
(n) setting said fifth variable to "−1"; and
wherein after operation (k), said comparing further comprises:
(o) when the value of said fourth variable is equal to the number of rows, returning a value contained in said fifth variable and going to and continuing processing from operation (l).

76. The method according to claim 75, further comprising: determining if said fifth variable contains a logical value of "0" after performing the logical AND operation, and if so, returning the value contained in said fifth variable and going to and continuing processing from operation (l); otherwise going to and continuing processing from operation (f).

77. The method according to claim 74, wherein said "don't care" segment is implemented once for those rows for which the same "don't care" applies.

78. A method according to claim 77, wherein said comparing further comprises:
(l) placing each parameter of said received data vector in a separate variable;
(m) for each group of vectors having one corresponding "don't care" segment, performing a first logical AND operation between the contents of each of the segments belonging to the group;
(n) performing a logical OR operation between a result of said first logical AND operation and a content of the corresponding "don't care" segment;
(o) performing a second logical AND operation between the results received after performing said logical OR operations; and
(p) returning the value received after performing said second logical AND operation.

79. The method according to claim 78, wherein prior to operation (e), said comparing further comprises: waiting to receive said data vector.

80. A computer-implemented method for checking an extended rule table having parameters with a range of values, the method comprising:
(a) providing a two dimensional rule table having a number of rows, wherein each of said rows comprises a number of segments, wherein each of said segments comprises a number of positions;
(b) storing rule vectors in said rule table, wherein said storing comprises:
(i) utilizing a first variable as a rule number position pointer, a second variable as a row counter, and a third variable as a segment pointer,
(ii) receiving a value of the parameter of said rule vector pointed to by said second variable, wherein said third variable is set to said received value;
(iii) wherein, if the received value is a range of values, then the method further comprises:

updating a cross reference table with a new sub-rule number for each value in the range of values, including recursive access if necessary; and setting a bit in the rule table to a logical "1", wherein the bit is in a row pointed to by said second variable, at the segment pointed to by a current value of said third variable, and in a position pointed to by said first variable, wherein said setting is repeated while cycling through the range of values;

(iv) increasing the value of said second variable by one; and (v) while the value of said second variable is smaller than a number of rows, going to and continuing processing from operation (b) (ii);

(c) comparing a received data vector to at least one of the stored rule vectors; and (d) returning a rule number indicator if a match is found between said received data vector and at least one of the stored rule vectors.

81. The method according to claim 80, wherein prior to operation (b) (ii), said storing further comprises:

(e) waiting for said rule vector to become available;

(f) calculating an amount of free space required for all the sub-rules possible and waiting for said rule table to have enough free space to store the sub-rules;

(g) setting said first variable to point to a next available rule number in said rule table;

(h) setting said second variable to zero;

wherein after operation (b) (v), said storing further comprises:

(vii) when the value of said second variable is equal to the number of rows, going to and continuing processing from operation (e).

82. The method according to claim 80, wherein the number of said segments is determined by a maximum number of possible values for said rule vector parameters.

83. The method according to claim 82, wherein each of the number of segments comprises a number of bits, wherein the number of bits is determined by a maximum number of rules allowed by a rule checking system.

84. The method according to claim 80, said method further comprising: providing a range of values to each parameter of said rule vectors.

85. The method according to claim 80, said method further comprising: formatting said range of values as a sequence of a first value followed by a hyphen, and further followed by a second value.

86. The method according to claim 80, said method further comprising:

creating sub-rules from original rules, wherein the sub-rules are configured to handle a range of values, and wherein the sub-rules define the rule vectors; and providing a sub-rule table, wherein the sub-rule table contains cross reference information so that a corresponding link can be made between the original rules and the sub-rules.

87. A computer-implemented method for checking a modified rule table having parameters with a range value, the method comprising:

(a) providing a two dimensional rule table having a number of rows, wherein each of said rows comprises a number of segments, wherein each of said segments comprises a number of positions;

(b) storing rule vectors in said rule table, wherein said storing comprises:

(i) utilizing a first variable as a rule number position pointer, a second variable as a row counter, and a third variable as a segment pointer;

(ii) receiving a value of the parameter of said rule vector pointed to by said second variable, wherein said third variable is set to said received value;

(iii) wherein, if a value of the parameter of the rule vector pointed to by said second variable is a single value, then setting both said third variable and a fourth variable to the value of the parameter; otherwise, if the value of the parameter of the rule vector is a range of values, then setting said third variable to a low value of the range of values, and setting said fourth variable to a high value of the range of values;

(iv) setting a bit in the rule table to a logical "1", wherein said bit is identified by a row pointed to by said second variable, at a segment pointed to by said third variable, and in a position pointed to by said first variable;

(v) increasing the value of said third variable by one;

(vi) while the value of said third variable is not larger than the value of said fourth variable going to and continuing processing from operation (iv);

(vii) increasing the value of said second variable by one; and (viii) while the value of said second variable is smaller than the number of rows, going to and continuing processing from operation (iii);

(c) comparing said received data vector to at least one of the stored rule vectors; and (d) returning a rule number indicator if a match is found between said received data vector and at least one of the stored rule vectors.

88. The method according to claim 87, wherein prior to operation (b) (ii), said storing further comprises:

(e) waiting for said rule vector to become available;

(f) waiting for said rule table to have enough free space to store said rule vector;

(g) setting said first variable to point to the next available rule number in the rule table; and (h) setting said second variable to zero, wherein after operation (b) (viii), said storing further comprises:

(ix) when the value of said second variable is equal to the number of rows, going to and continuing processing from operation (e).

89. The method according to claim 87, wherein the number of said segments is determined by a maximum number of possible values for said rule vector parameters.

90. The method according to claim 87, wherein each of the number of segments comprises a number of bits, wherein the number of bits is determined by a maximum number of rules allowed by a rule checking system.

91. The method according to claim 87, said method further comprising: providing a range of values to each parameter of the rule vectors.

* * * * *